(12) United States Patent
Shawver

(10) Patent No.: US 9,495,351 B1
(45) Date of Patent: Nov. 15, 2016

(54) WRITING A VISUAL LANGUAGE

(71) Applicant: Mary L Shawver, Boise, ID (US)

(72) Inventor: Mary L Shawver, Boise, ID (US)

(73) Assignee: Mary Shawver, Boise, ID (US)

(*) Notice: Subject to any disclaimer, the term of this patent is extended or adjusted under 35 U.S.C. 154(b) by 32 days.

(21) Appl. No.: 14/144,490

(22) Filed: Dec. 30, 2013

Related U.S. Application Data

(60) Provisional application No. 61/893,232, filed on Oct. 20, 2013.

(51) Int. Cl.
  *G06F 17/28* (2006.01)
  *G06F 15/16* (2006.01)
  *G10L 13/00* (2006.01)
  *G06F 3/023* (2006.01)
  *G06F 17/27* (2006.01)

(52) U.S. Cl.
  CPC .................................. *G06F 17/27* (2013.01)

(58) Field of Classification Search
  CPC ........ G06F 17/28; G06F 15/16; G06F 3/023; G10L 13/00; G10L 16/28
  USPC ............. 704/3, 271; 709/250; 345/171, 172; 434/233
  See application file for complete search history.

(56) References Cited

U.S. PATENT DOCUMENTS

| | | | | |
|---|---|---|---|---|
| 5,486,112 A | * | 1/1996 | Troudet | G09B 13/04 2/160 |
| 5,507,649 A | * | 4/1996 | Troudet | G09B 5/065 434/112 |
| 5,571,020 A | * | 11/1996 | Troudet | G09B 5/065 2/160 |
| 7,565,295 B1 | * | 7/2009 | Hernandez-Rebollar | G06K 9/00355 382/182 |
| 8,325,883 B2 | * | 12/2012 | Schultz | H04M 3/42391 370/466 |
| 2003/0069997 A1 | * | 4/2003 | Bravin | G06F 17/2765 709/250 |
| 2008/0109208 A1 | * | 5/2008 | Curry | G09B 5/06 704/3 |
| 2010/0023314 A1 | * | 1/2010 | Hernandez-Rebollar | G06F 3/017 704/3 |
| 2010/0063794 A1 | * | 3/2010 | Hernandez-Rebollar | G06K 9/00355 704/3 |
| 2011/0285635 A1 | * | 11/2011 | Ohki | G06F 3/0219 345/171 |
| 2011/0301934 A1 | * | 12/2011 | Tardif | G06F 3/017 704/1 |
| 2015/0046148 A1 | * | 2/2015 | Oh | H04N 5/44591 704/3 |

* cited by examiner

*Primary Examiner* — Pierre-Louis Desir
*Assistant Examiner* — Seong Ah A Shin

(57) ABSTRACT

The research comprised within this document validates that the parameters and features of sign language can be written within the constraints of the symbols and characters located on a standard keyboard for the purpose of reading and writing a visual language. This writing system is a means for writing signed languages and emphasis is placed on this pursuit, however, this method of writing could be used for writing gestures, movements and poses. This method of writing is easier to use than previous methods developed for writing sign language, because the media methods, typing and hand-printing, are readily available and easily accessible for communication. The keyboards ability to accommodate Braille allows individuals who are both Deaf and blind access to this method of writing.

1 Claim, 22 Drawing Sheets

Figure 1A- Alphabet Handshapes
| Upper row | Letter | Image | Description |
|---|---|---|---|
| 1 | QD and qd | 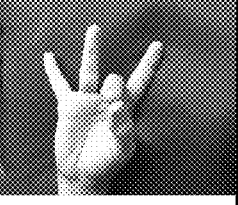 | HS 8 |
| 2 | QZ and qz | 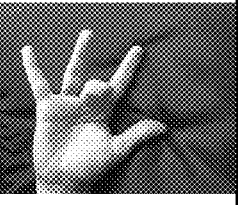 | HS open 8 |
| 3 | W and w | 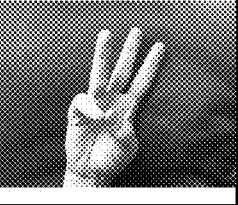 | Handshape w |
| 4 | WM and wm | 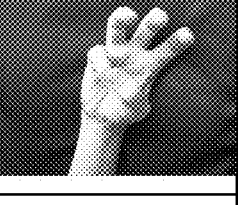 | HS bent w |
| 5 | E and e | 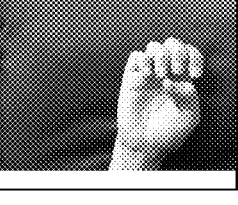 | Handshape e |

Figure 1B- Alphabet Handshapes
| 6 | EG and eg | 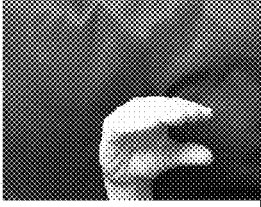 | HS full finger g |
|---|---|---|---|
| 7 | R and r | 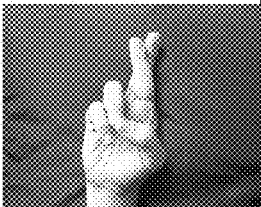 | Handshape r |
| 8 | T and t | 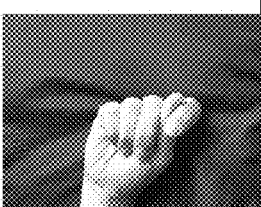 | Handshape t |
| 9 | TG and tg | 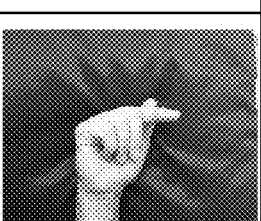 | HS mod t |
| 10 | Y and y | 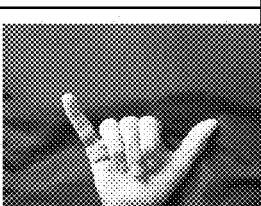 | Handshape y |
| 11 | YL and yl | 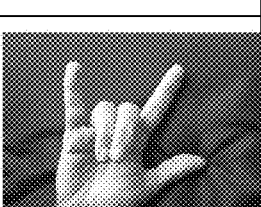 | HS ILY |

Figure 1C- Alphabet Handshapes
| 12 | U and u | 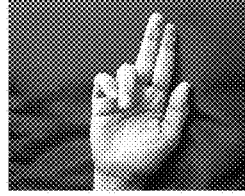 | Handshape u |
| --- | --- | --- | --- |
| 13 | I and i | 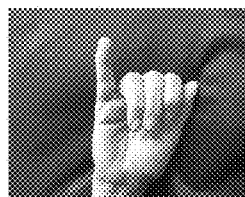 | Handshape i |
| 14 | O and o |  | Handshape o |
| 15 | OG and og |  | HS flat o |
| 16 | P and p |  | Handshape p |
| 17 | PV and pv | 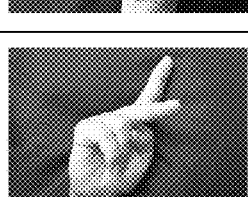 | HS p modify |

Figure 1D- Alphabet Handshapes
| Lower Rows | Letter | Image | Description |
|---|---|---|---|
| 18 | A and a |  | Handshape a |
| 19 | AL and al | 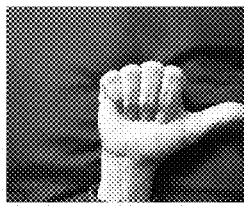 | HS a modify |
| 20 | S and s | 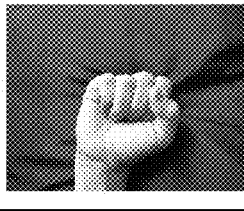 | Handshape s |
| 21 | D and d |  | Handshape d |
| 22 | F and f | 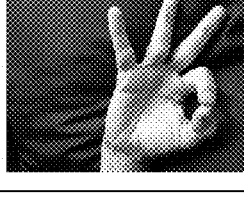 | Handshape f |

Figure 1E- Alphabet Handshapes
| 22 | F and f | 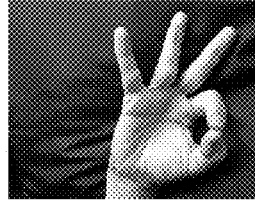 | Handshape f |
| --- | --- | --- | --- |
| 23 | FB and fb | 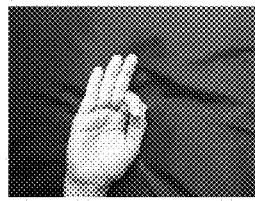 | HS closed f |
| 24 | FG and fg | 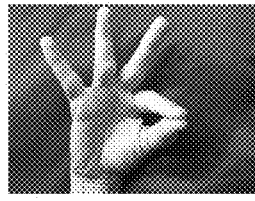 | HS flat f |
| 25 | G and g | 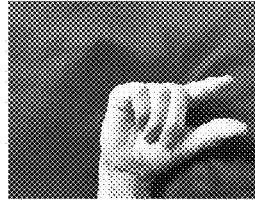 | Handshape g |
| 26 | GD and gd | 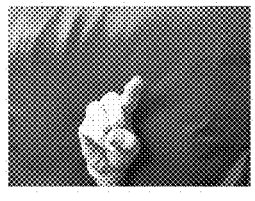 | HS g mod |
| 27 | GO and go | 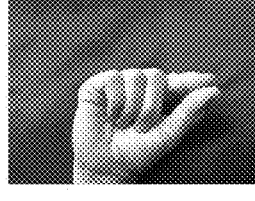 | HS closed g |

Figure 1F- Alphabet Handshapes
| 28 | H and h | 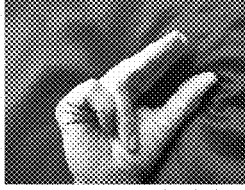 | Handshape h |
| --- | --- | --- | --- |
| 29 | HO and ho | 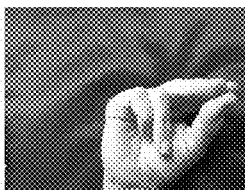 | HS closed h |
| 30 | JB and jb | 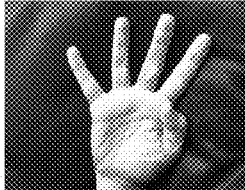 | HS 4 |
| 31 | JO and jo | 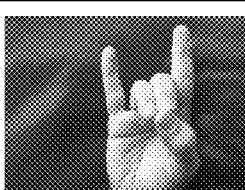 | HS 'Bull' |
| 32 | KU and ku | 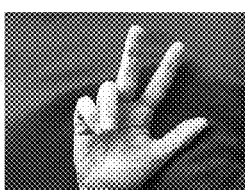 | HS 3 |
| 33 | KC and kc | 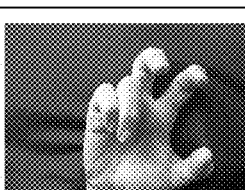 | HS bent 3 |

Figure 1G- Alphabet Handshapes
| 34 | L and l | 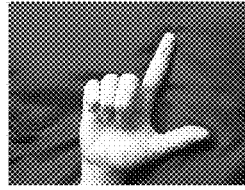 | Handshape L |
| --- | --- | --- | --- |
| 35 | LB and lb | 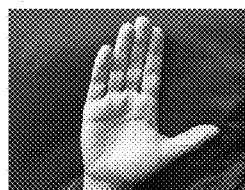 | HS L with all 4 fingers |
| 36 | ZB and zb | 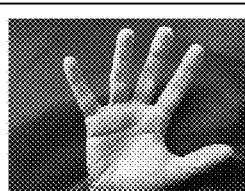 | HS 5 |
| 37 | ZC and zc | 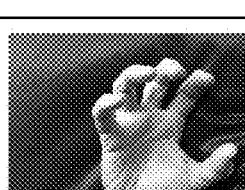 | HS claw |
| 38 | X and x | 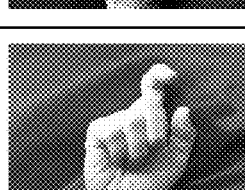 | Handshape x |
| 39 | XO and xo |  | HS closed x |

Figure 1H- Alphabet Handshapes

| 40 | C and c | | Handshape c |
|---|---|---|---|
| 41 | CL and cl | | HS mod c |
| 42 | V and v | | Handshape v |
| 43 | VN and vn | | Handshape vn |
| 44 | VX and vx | | HS bent v |
| 45 | B and b | | Handshape b |

Figure 1I- Alphabet Handshapes
| 46 | BA and ba | 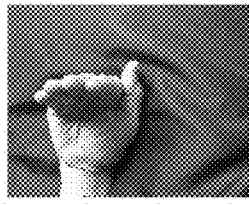 | HS bent b |
| 47 | N and n | 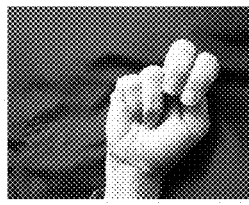 | Handshape n |
| 48 | NI and ni | 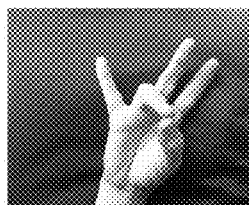 | HS 7 |
| 49 | M and m | 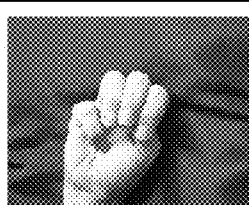 | Handshape m |
| 50 | MC and mc |  | HS full hand cupped |

Figure 1J- Manual Alphabet in Frozen Text
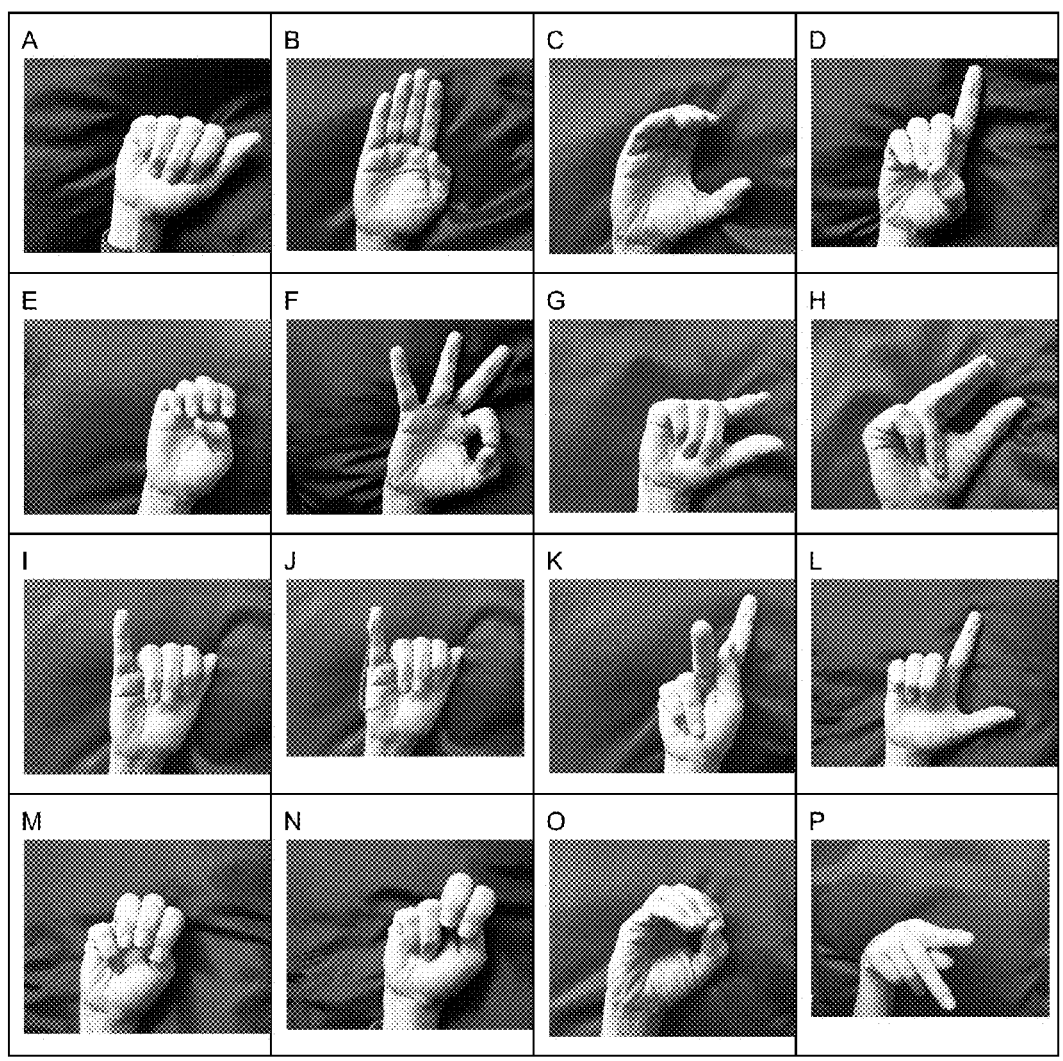

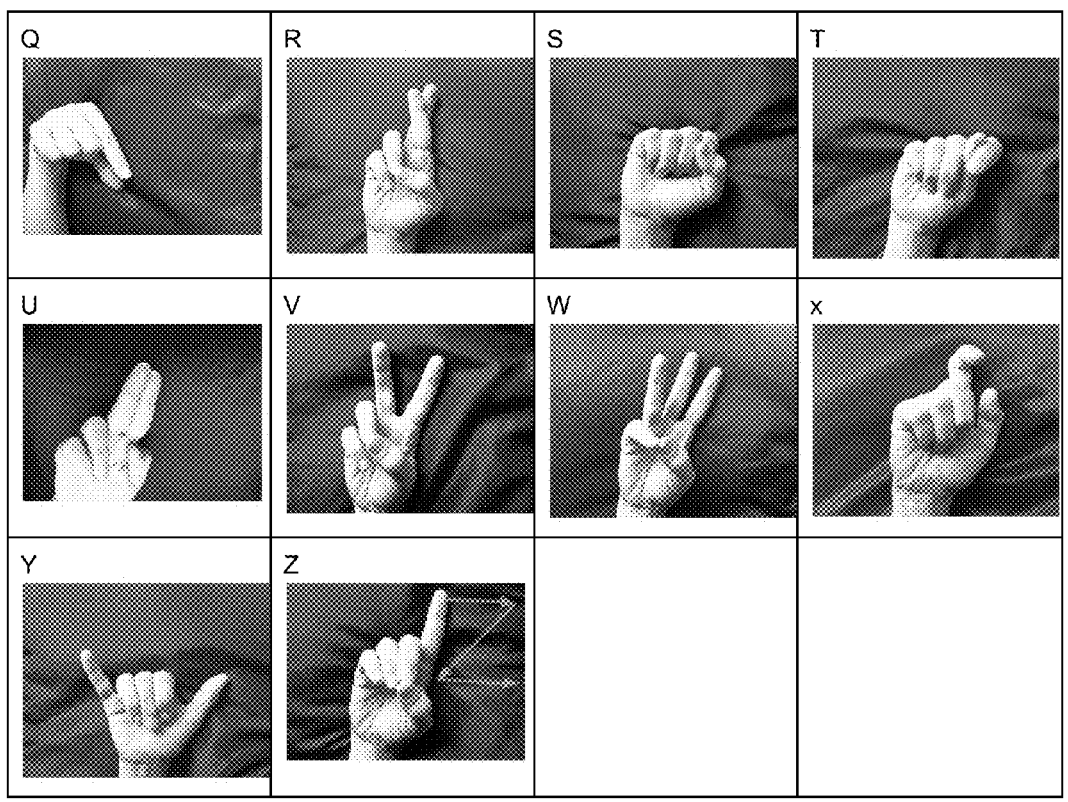
Figure 1K- Manual Alphabet in Frozen Text

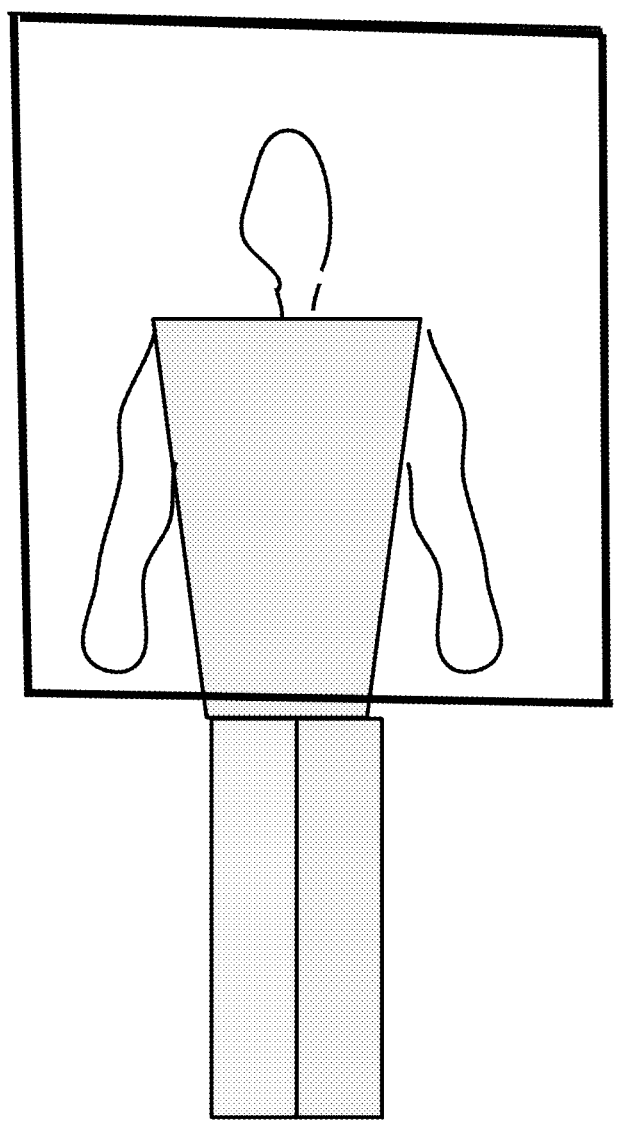
Fig. 2- The Signing Box

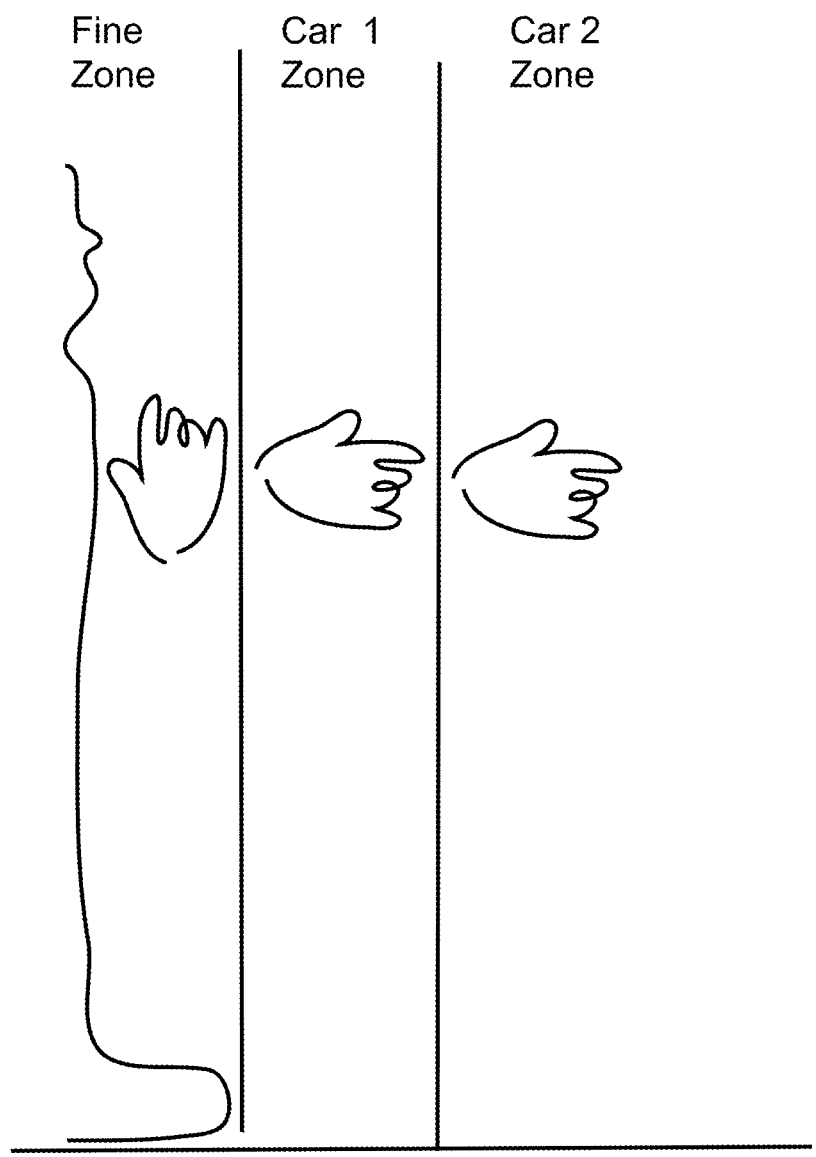

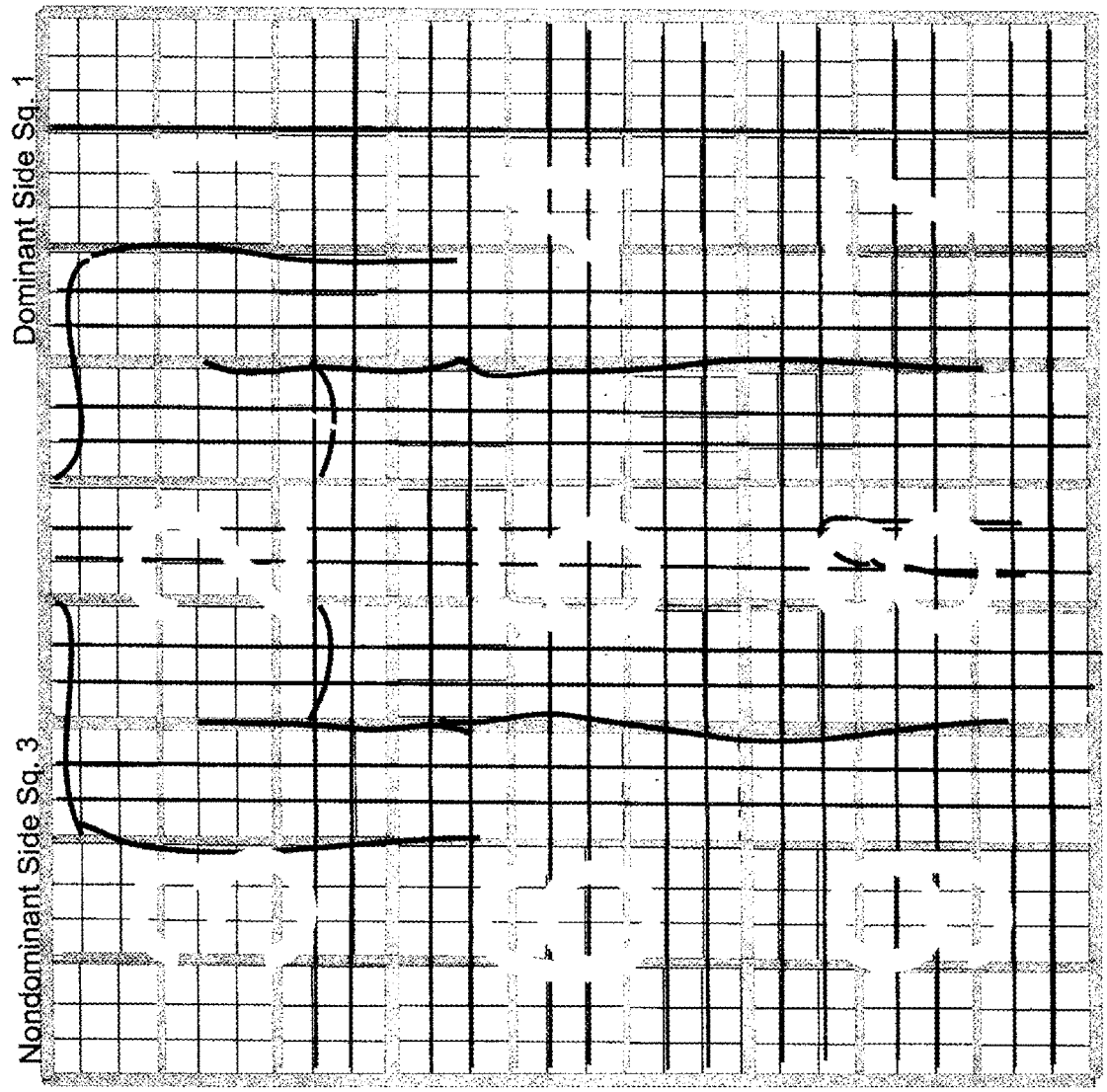

Locators- Body

265- Heart
555- Belly Button
222- Base of Neck
135- D Shoulder
315-ND Shoulder
245-D Chest Near Pit
265-ND Chest Near Pit
845-D Thigh
865-ND Thigh Fig. 4C
Locators- Body 265- Heart
555- Belly Button
222- Base of Neck
135- D Shoulder
315-ND Shoulder
245-D Chest Near Pit
265-ND Chest Near Pit
845-D Thigh
865-ND Thigh

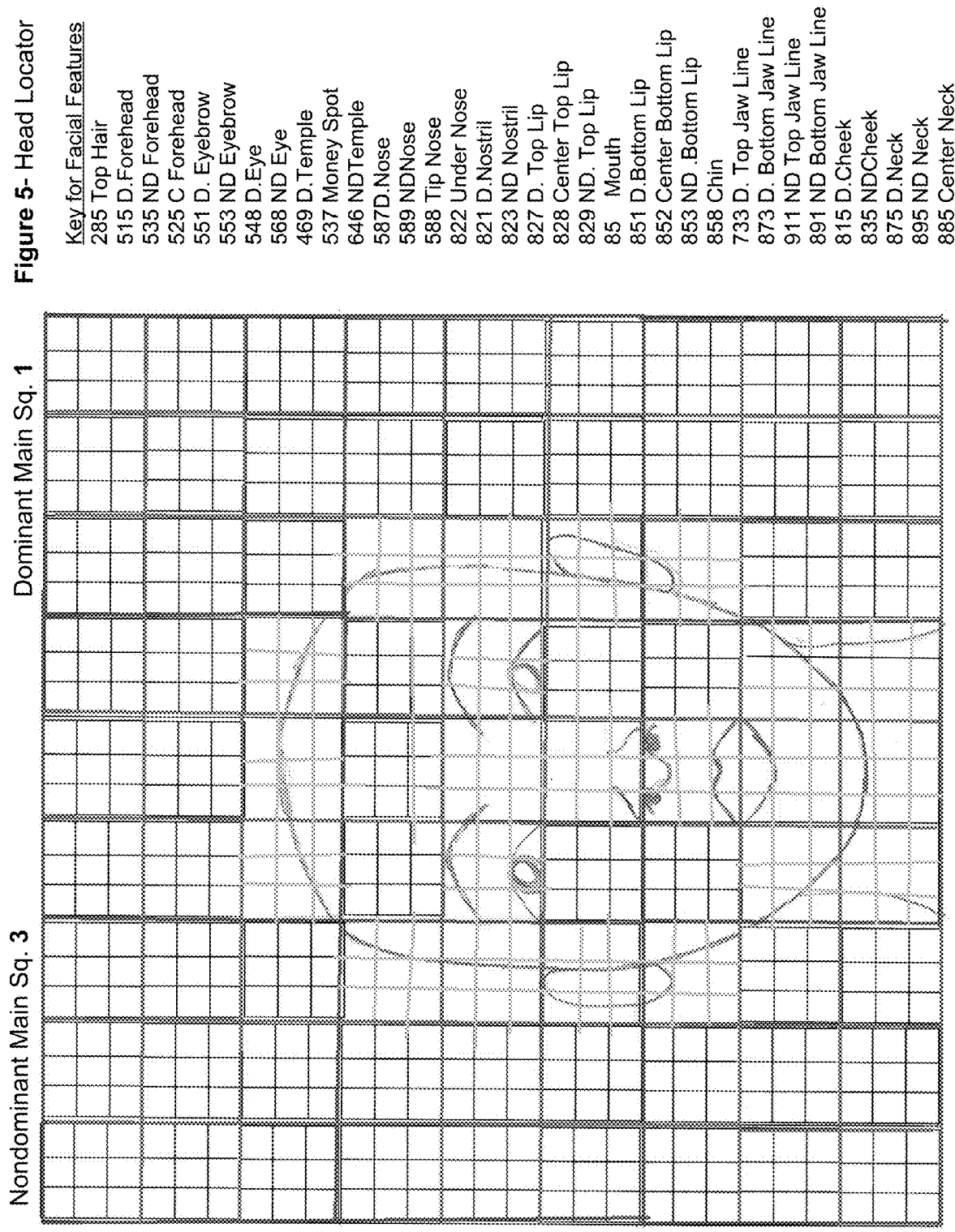

Figure 5- Head Locator

Key for Facial Features
285 Top Hair
515 D.Forehead
535 ND Forehead
525 C Forehead
551 D. Eyebrow
553 ND Eyebrow
548 D.Eye
568 ND Eye
469 D.Temple
537 Money Spot
646 NDTemple
587 D.Nose
589 NDNose
588 Tip Nose
822 Under Nose
821 D.Nostril
823 ND Nostril
827 D. Top Lip
828 Center Top Lip
829 ND. Top Lip
85 Mouth
851 D.Bottom Lip
852 Center Bottom Lip
853 ND .Bottom Lip
858 Chin
733 D. Top Jaw Line
873 D. Bottom Jaw Line
911 ND Top Jaw Line
891 ND Bottom Jaw Line
815 D.Cheek
835 NDCheek
875 D.Neck
895 ND Neck
885 Center Neck Finger Locator Sides of Finger
Closest to body is 1 (as seen on the thumb)
Back of fingers is 2
Farthest from body is 3
Palm side of fingers is the default Palm Grid Locator Zones: Bottom Grid Indicator

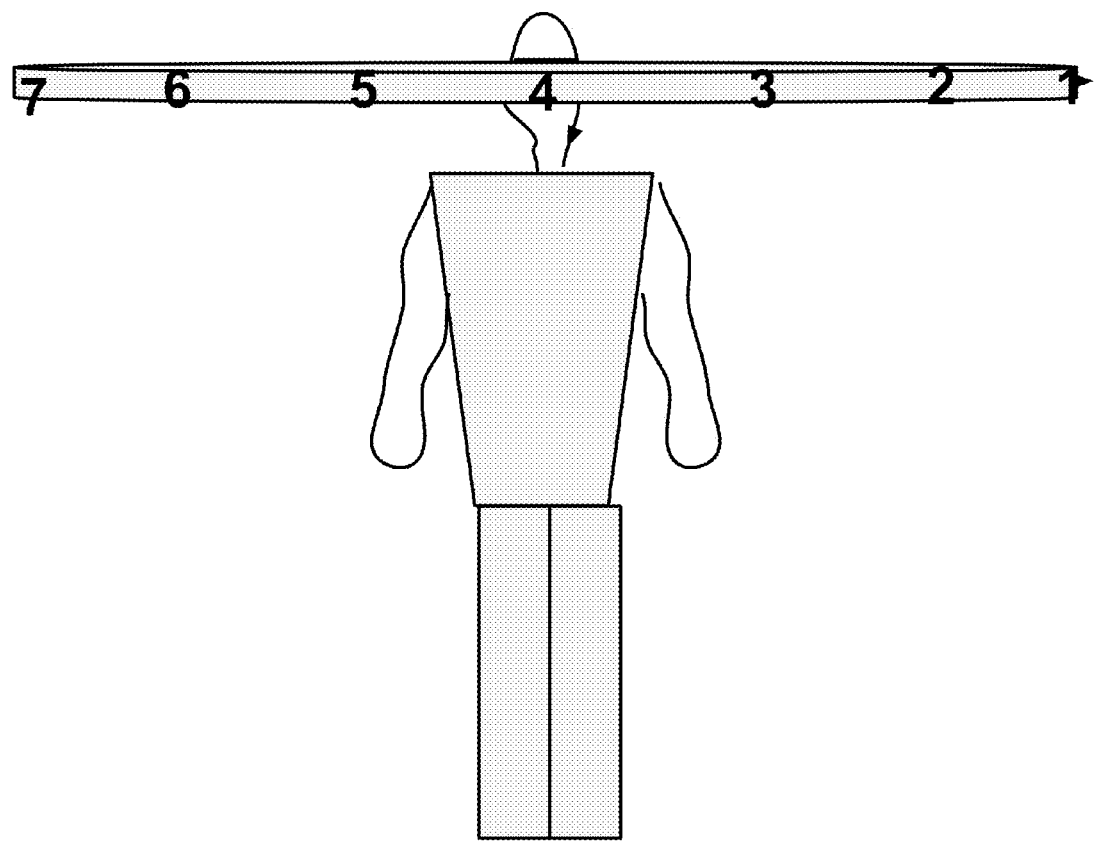
Fig. 9- The Positions Dominant to Nondominant

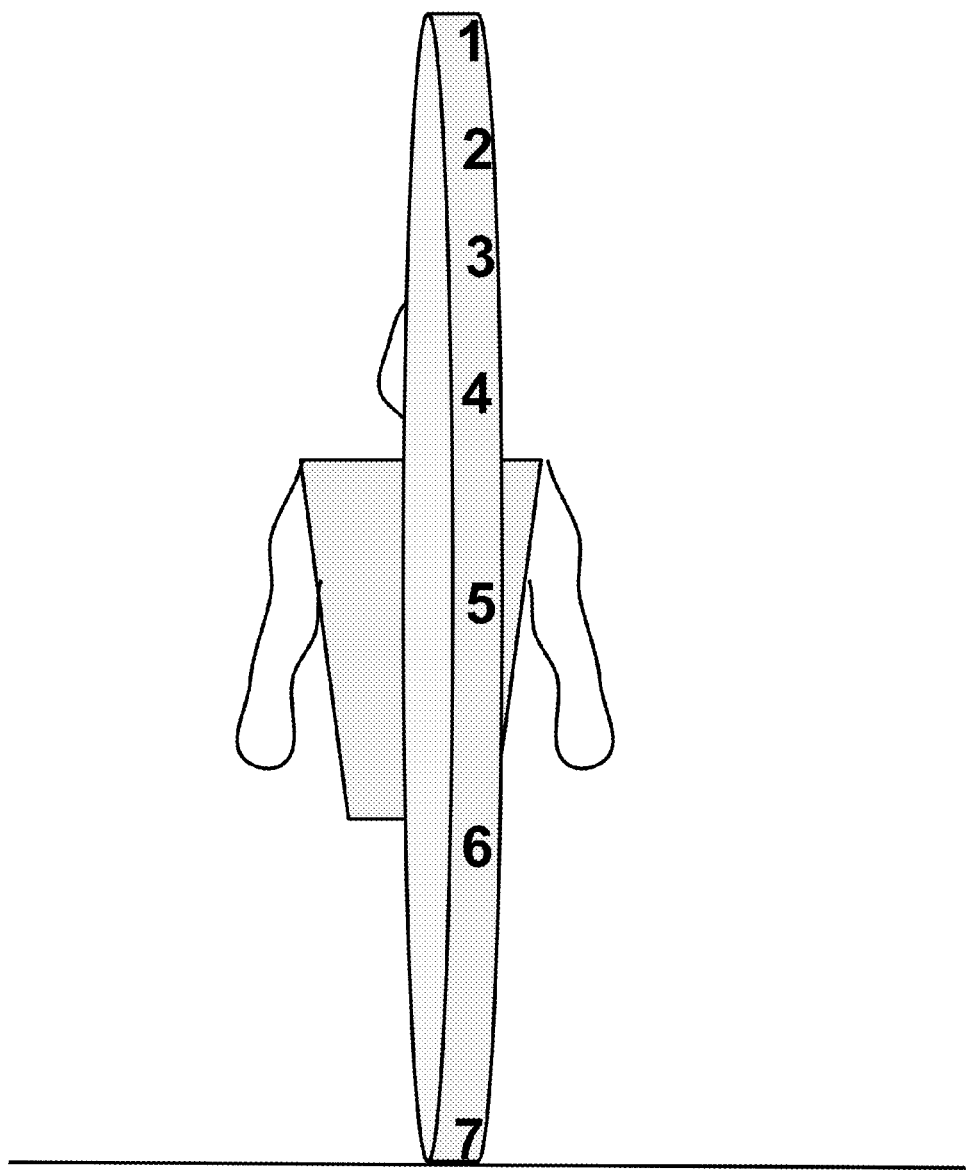
Fig.10- The Positions of of the NMMs up to down

WRITING A VISUAL LANGUAGE

CROSS REFERENCE TO RELATED APPLICATION

This application claims the benefit of U.S. Provisional Application Ser. No. 61/893,232, filed Oct. 20, 2013.

BACKGROUND OF THE INVENTION

Establishing an accepted form of writing sign language has been an ongoing challenge. Previous attempts have not truly incorporated the plethora of features of the language; therefore, most of the reading of signs were subjective.

Previous systems were not linear and required a significant amount of area on a piece of paper in order to be transcribed. Unique characters that represent poses and movements in American Sign require a conversion program in order to type this method on a computer; prior attempts also required the learner to memorize hundreds of new characters that are unique to the dominance preference.

BRIEF SUMMARY OF THE INVENTION

In view of the foregoing the present invention is directed to a system and practice for a written sign language that incorporates the multitude of features within signed communication. This system has overcome obstacles and encompasses features of ASL including handshapes, location, palm orientation, dominance, contact, close proximity, movement, shifts, timing, reference hand, non manual markers and body shifts with the potential for adding more.

These and other goals are achieved by improving a standard keyboard by reassigning parameters of sign language to the symbols therein. This allows for linear transcription using familiar media.

BRIEF DESCRIPTION OF THE DRAWINGS

FIG. 1 is a list of handshapes used to create signs. The figure consists of eleven pages. The list includes the letter, image and vernacular description of the handshape as well as the location on the standard keyboard FIGS. 1A through 1C align with the letters on the upper row of the qwerty keyboard, and FIGS. 1D through 1I align with the bottom rows. FIGS. 1J and 1K are images of the Manual Alphabet which are commonly used to fingerspell words.

FIG. 2 is a drawing of The Signing Box. The area in the square shows the signing space often used for explaining the general area where the majority of sign production occurs, but the Signing Box does not suffice for identifying specific locations that comprise a sign.

FIG. 3 shows the measurements of space that are incrementally identified by moving in hand lengths forward away from the body. These measurements are divided into three zones that assist in locating the depth of the sign.

FIG. 4 consists of three pages, FIGS. 4C, 4B and 4A which comprise the small squares within medium squares within 9 large squares respectively per page.

FIG. 5 is a numbering system which uses a grid consisting of small, medium and large squares to identify the head and surrounding locations.

FIG. 9 is a drawing of location positioned from dominant to nondominant sides. These horizontal locations are used to depict part of the non manual markers (NNMs) location.

FIG. 10 is a drawing representing the means for identifying up through down location positions. These vertical locations are used to depict part of the non manual markers (NNMs) location.

GLOSSARY OF TERMS

Figure 4B:
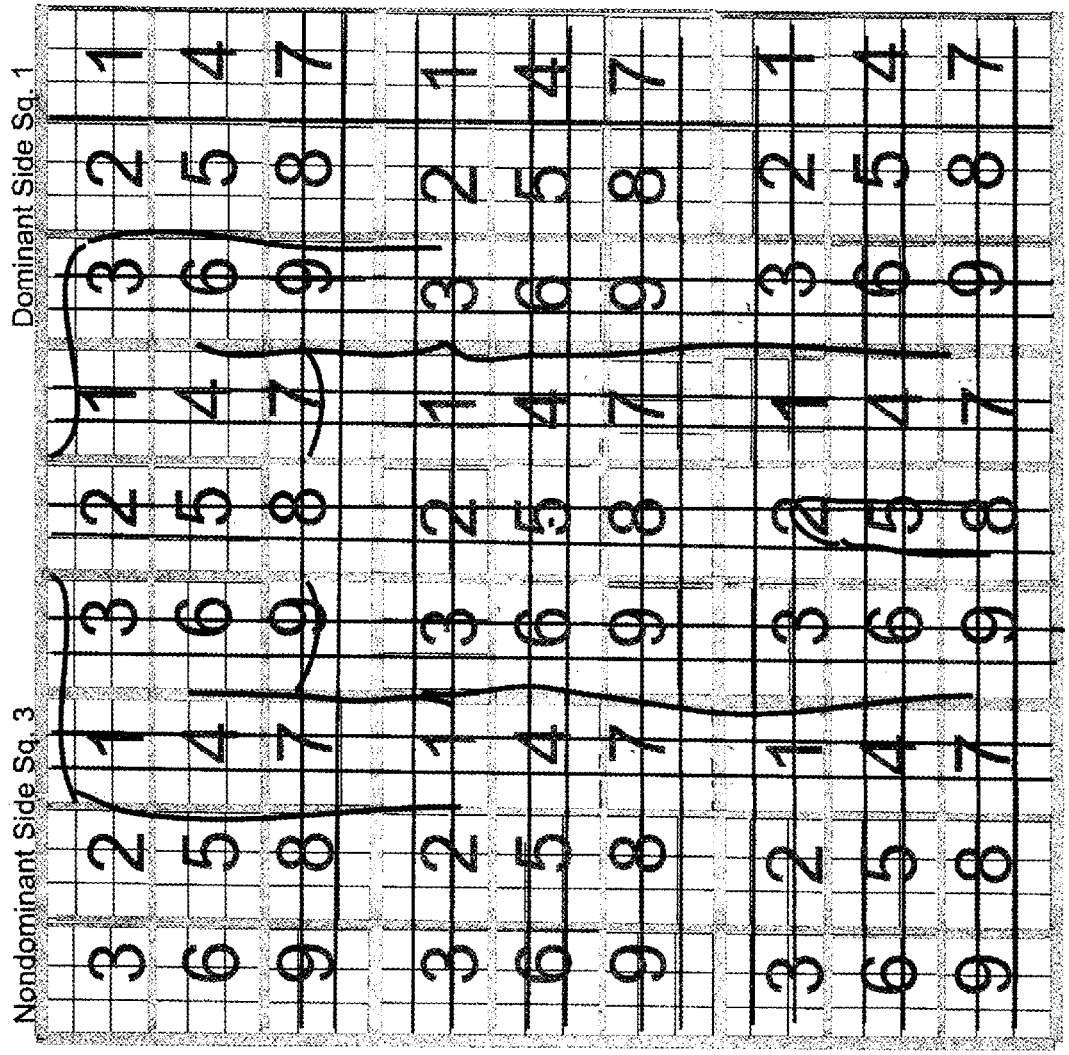
FIG. 4 is a numbering system which uses a grid to identify the body and surrounding locations.

Glossary of Terms is comprised of 3 pages of terms in alphabetical order used to identify and define concepts relating to this orthography.

DETAILED DESCRIPTION OF THE INVENTION

Chapter 1—Defining the Parameters

Common sign language parameters are defined by the way the sign is formed. Typically, these parameters are listed as Handshape, Location, Palm Orientation, Movement, and Non-Manual Markers (NMMs). After further review, more characteristics of the manual part of the language needed defined. Other features included in this paper are Dominant Markers, Timing Markers, Shifts (similar to syllables in spoken languages), Referent Markers, Close Proximity Markers and Touch Markers. These latter parameters and features are also necessary to create manual signs and gestures.

NMMs are different from Manual Markers (MM's), the use of your hands, in that they include different areas of the body—face, head and torso—that communicate additional information. NMMs are also commonly called facial grammar. The NMM parameter was defined in this research to include body shifts, eye gaze, and isolated locations on the head and body when significant movement occurs to communicate information.

The Process: This paper consists of both written English and written ASL. For ease of reading, the reader is asked to evaluate symbols for signed meaning when an English translation appears to be incomprehensible.

Defining the Characters—

In this section, specific keyboard symbols are paired to the different parameters of ASL by making character selection. This process of establishing certain keys to correlate with specific features of ASL involved giving special consideration to potential outcomes. For example, the choices made on the keyboard needed to be evaluated in terms of how they could allow for the ease of creating the words in signs.

Evaluation of sign parameter and symbol correlation were based on five main considerations. First, selections needed to be made by choosing symbol representation that would create a visual image with the selection. By being conscious of what visual representation might be inherent in a character, whether that was an iconic symbol or a conceptual meaning, character choices could aid in ease of learning the writing system. For example the symbol < the arrow pointing to the non dominant side, is iconic for assisting in Palm Orientation. A conceptual representation was chosen with the & symbol being used to show connections of NMMs and MMs, since & or 'and' tend to create a similar concept.

Building on this familiar concept, a second way that choices for characters were decided was by the familiar correlations that already exist. Letters that correlate to the manual alphabet handshapes were chosen. The Manual Alphabet consists of the letters used to produce fingerspelled words. In American Sign Language the fingerspelled words are spelled similar to English. In Lingua italiana siena, LIS, they fingerspell words similar to spoken Italian words and other countries have similar fingerspelled systems as well.[1] The list of images in FIG. 1J and FIG. 1K correlate to the American Sign Language Manual Alphabet. The handshapes from the LIS or Italian Sign Language system are very similar with minor differences. The Manual Alphabet is used for ASL and Signed English. The correlation between the fingerspelled words on the keyboard and the spoken or Signed English word translations note the exact same letters and handshapes.

Considerations were also made to find patterned methods that could be easily repeated in constructing written words. Visual repetition of numbers relating to grids were established, and these pattern grids were repeated in several locations—on the palm, forearm, bicep/tricep, head and body locators. This repetition of the grid also repeated within similar larger grids making the ability to pinpoint locations easier than having a straight count of 729 areas within a signing grid. The Head and Body Locator grids (FIG. 4 and FIG. 5) are examples of this.

Obviously, the choice made to correlate the keys to the sign language parameters had to be done in such a way that the character was flexible enough to allow for functionality variance. An example of a selection with this consideration is that all handshapes had to be associated to letters. In doing this, capital letters are correlated to the Head Locators, and lower case letters are associated with the Body Locators. Functionality was priority in making overall decisions. This includes creating symbols that can represent the features of ASL with a functional system. The way the word was written had to be analysed. The symbols needed to be placed in an order that would assist with ease of reading the different characters.

Finally an effort was made to create ergonomic choices so that ease of typing the information in ASL would be achieved. Consideration was given to commonly used features in ASL so that the writer wouldn't have to place their hands on keys on the keyboard in a way that created awkward typing. For example, initially the asterisk * was used for the shift; later this was changed to the comma , so that ease of typing could be achieved. In the same way, initially the prime symbol ' on the far corner of the keyboard was used to show the zone where the sign was located; later this was changed to the apostrophe symbol ' for the Car 1 Zone, and a quote symbol " for the Car 2 zone. These keyboard characters were chosen for ease of typing in ASL. To compare purpose, the standard keyboard is arranged for English speakers in a convenient fashion for usage rather than just placing the keys on the keyboard in alphabetical order.

Handshapes

The first parameter correlated keys to the handshapes. The obvious resolve for grouping is to use the alphabet for the handshapes. The manual alphabet was easily identified, however other significant handshapes also needed to be represented. Classifiers and numbers needed to take on handshapes that did not have a direct correlation to the keys like the manual alphabet did. In order to accommodate this difference, keys on the standard keyboard were paired and assigned new meaning. A 'zb' for instance became a representation of the '5' handshape. This was done for several handshapes that have significant value (See FIG. 1A-FIG. 1I). All handshapes became a part of the alphabet keys. Currently, there are 50 handshapes listed. This list is not exhaustive; new handshapes may be added to this list as they are deemed necessary and useful. The handshape can be identified, and then letter combinations that correlate to a descriptive/iconic representation of the handshape can be established. Some examples that have already been established are the 'flat o' is represented with the 'OG' letters, and the 'bent v' is represented with the 'VX' letters. Once the letters are defined as the representation for the handshape, they become unique to that handshape. This means that a 'VX' or a 'vx' could not represent any other handshape. The VX or vx letter combination is exclusive to the 'bent v'. The letter combinations should stay to a minimum combination. Letter combinations that include sets of more than 5 letters would be extraneous. Note that "OG" is not the same handshape as "GO". 'OG' is the 'flat o', whereas 'GO' is a 'closed g' handshape. This shows that the letter placement is unique to a specific handshape.

Location

The next parameter to address was location. This is a critical parameter. Location must be precise to the size of the fingertip, because signed languages use space in explaining details. Location is commonly identified by the 'signing box'. This box is usually drawn as large square encompassing the area around the head and body. This square would typically reach from just above the head down to the hips, and from about 5-6 inches outside the left arm to about 5-6 inches outside the right arm (See FIG. 2). This model is appropriate for explaining the general area in front of a person where the signing or hand movements happen, but does not suffice for defining the specific locations that comprise the signs. Further definition of parameters were incorporated in this research, and hence the following parameters have been added: body locators, head locators, zones, and arm/hand locators. The location parameter needs to be expanded to identify the 3D space from the body to the outstretched fingertips (zones). The location also needs to include locations on the hands and arms. The location area is divided into 3 main parts—the head, body, and arms & hands. Areas are also divided into several zones.

Zones—Measurements of space that are incrementally identified by moving in hand lengths forward from the body, can be defined as zones (See FIG. 3).

The first zone is determined by placing a '5' or 'zb' handshape on the center of your chest. The distance away from your body between your thumb to your pinky is zone one, called the Fine Zone. This zone extends outward and in a parallel plane in front of the body. Zone 1 or the Fine Zone is considered the default zone, so no keyboard character is given to identify this space.

The second zone or Car 1 Zone is identified by starting at the end of the Fine Zone and moving forward the distance from your wrist to the end of your longest finger (See FIG. 3). This zone is represented by using the apostrophe '.

The third zone or Car 2 Zone begins at the end of the Car 1 Zone. This zone is also the distance from your wrist to the end of your longest finger (See FIG. 3).

This zone is represented by using the symbol ".

These three zones make up the area in front of your head and body by going out to the length of your arm with a slightly bent elbow. This gives the sign depth; the zone adds the 3D element. By identifying a specific zone, the sign can be written with the flexibility of moving in toward the body or away from the body in a perpendicular direction to the body. There is a lot involved in defining the signing area. The zones establish the depth of the sign, but the height and width need to be defined as well.

Body Locations A numbering system that works like a grid is used to define the area in front of the body and to the sides of the body (See FIG. 4A). The grid incorporates main 9 sections. These main sections are shown in FIG. 4A. The first section of the grid will identify the area of the body that is in front of the dominant shoulder and also the space directly adjacent to the body on the dominant side. This first section is called section 1. The next division of the squares is in the middle of the chest. This division extends from the underarm areas down just below the pecs and up to the base of the neck. This region is section 2. Section 3 is a mirror image to section 1, but this division is the space located in front of the non-dominant shoulder. These first three sections complete the top row of the grid. Directly below this first row is the second row. The ordering of this area also counts from the dominant side to the non dominant side beginning with 4 and ending with 6. These areas are all divided into equal sections. Section 5 is the mid section or the area around the belly button. This section extends from the sides of the body just below the chest down to just above the groin area. The final row is below row 2. Again, the reader needs to count from dominant to nondominant by dividing them into equal area of 7, 8, and 9. This final row extends lower than a typical sign space box would go. Noting this area is necessary to capture signed words like pants, skirt, dog, etc. These signs use space outside of the signing box. For this reason the area chosen within the grids extends to these outer regions of the body. The area below this last row can be added by using the bar symbol '|' prior to identifying the grid in front of the legs and feet. This grid would be available to use when needed, but the tendency would be to use this grid in gesturing more often than signed communication.

Once the 9 areas are identified, another division needs to happen. This is another set of 9 squares divided equally within each of the 9 main sections previously defined in the above paragraph, and identified in the FIG. 4A. These smaller sets of nine squares are seen in the FIG. 4B. These nine squares that are shown in FIG. 4B get divided a third time. This third division (See FIG. 4C) allows for 729 specific areas to be identified in the sign space directly in front of and adjacent to the body. When identifying a specific spot on the grid, you start by calling out the biggest square. For example, the heart is identified in the large number 2 square. Then, to further specify this location over the left pectoral muscle, the second set of medium size squares (FIG. 4B) are denoted within the 2 square that is found in FIG. 4A. The medium sized square identifies the heart within the number 6 area. Finally, the third set of squares shown in FIG. 4C, pinpoint the heart's location in the center area of the left pectoral muscle. Hence, the heart location is written as 265.

Other significant places found on the body are the belly button at 555, the base of the neck at 222, the dominant shoulder, or the fingerspelling location is at 135. By setting up the grid this way, some signs that do not need the precision can be written in the main square mode, while very specific signs can be incorporated to the second and/or third level of the grid identification.

Head Locators The head locators work in a similar fashion as the body locators (See FIG. 5). The head location is also divided into nine main sections of a large square. The top row of the square is counted from the dominant to the nondominant side. The first square is above the head's dominant temple and to the dominant side. This is section 1 in the head locator. The second square is over the head from the dominant temple to the nondominant temple. This square includes the top crown of the head. The third square is over the nondominant side from the nondominant temple to the nondominant side. The second row begins about half the faces width of the face out away from the face on the dominant side. This row comes in to the side close to the dominant eyebrow. And reaches from the dominant side of the crown, down to the base of the ear. This is square number 4. Square 5 goes from the farthest side of the dominant eyebrow to the other farthest side of the nondominant eyebrow. This square extends from the top of the forehead down to the tip of the nose. The last square in row two is the mirror of square 4 on the nondominant side. The bottom row of the main square is directly below the second row. Square 7 initiates from the dominant side, and then extends from the base of the ear down to the area just above the base of the neck. The center square on the bottom row is square 8, and the last square of the main square is on the nondominant side. This is square 9. All of these 9 squares just described can be seen in FIG. 5. These are the squares that are similar in size to the square sizes identified in FIGS. 4A, 4B and 4C.

Each square is divided into another 9 square section. These nine squares are shown similar in size to the square size identified in FIG. 4B. For example, the first main square on the dominant side of the head is square number 1. This square, square number 1, can now be divided into nine sections. Now these smaller squares can also be divided down into another set of 9 squares forming a third set of squares. These are shown similar in size to the square size identified in FIG. 4C. This method of locating a specific area allows specific places on the face, head and neck to be identified as well as its surrounding area. For example, in this head locator grid, the dominant eye is 548, the non-dominant eye is 568, the chin is 858 and so on.

Hand and Arm Locators

The final locator area to define is the hand and arm. The hand is divided into several sections. The sections include ways to define the fingers and palm section of the hand.

Finger Locators

Figure 6:
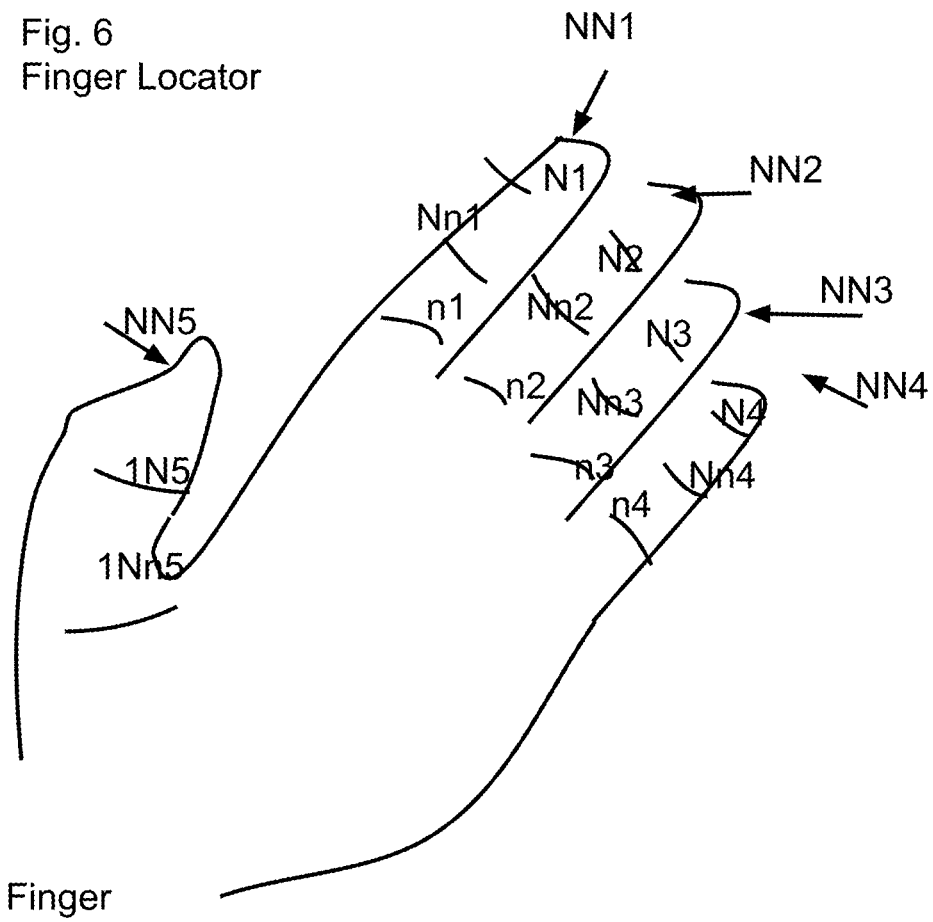
FIG. 6 identifies finger locations in patterns using combinations of the letter N in lower and upper case and the numbers 1 through 5

The first section discusses the area around the fingers. These areas include the sides of the fingers, the areas between the knuckles, and the identification of the fingers themselves (See FIG. 6).

Finger Sides Identifiers—The sides of the fingers are identified by the numbers 1-3. The first area is the inside or palm side of the finger. This is the assumed part of the finger, so no number is assigned to this part. Next to the inside of the finger, located on the side closest to the body, is side number 1. The back of the finger is 2, and the side farthest away from the body is identified as number 3.

Knuckle Division Markers—The area between the knuckles are separated by using the letter 'N' or 'n' in different combinations. The base of the finger to the bottom knuckle is represented with a lowercase 'n'. Moving up the finger to the next knuckle, that section is identified with both a capital 'N' and a lowercase 'n'—namely 'Nn'. The upper section of the finger is defined with a capital 'N', and the tip of the finger is represented with two capital 'N's'—namely 'NN'.

Finger Identifier—The final part of the finger locator method includes identifying which finger. The fingers are numbered starting with the index finger as number 1; 2 is the middle finger. Three is the ring finger, and 4 is the pinky finger. The thumb is number 5.

Palm Locators

The second part of the hand that needs to be defined is the palm.

Palm Identifier—The palm area is first identified by the number 4.

Figure 7:
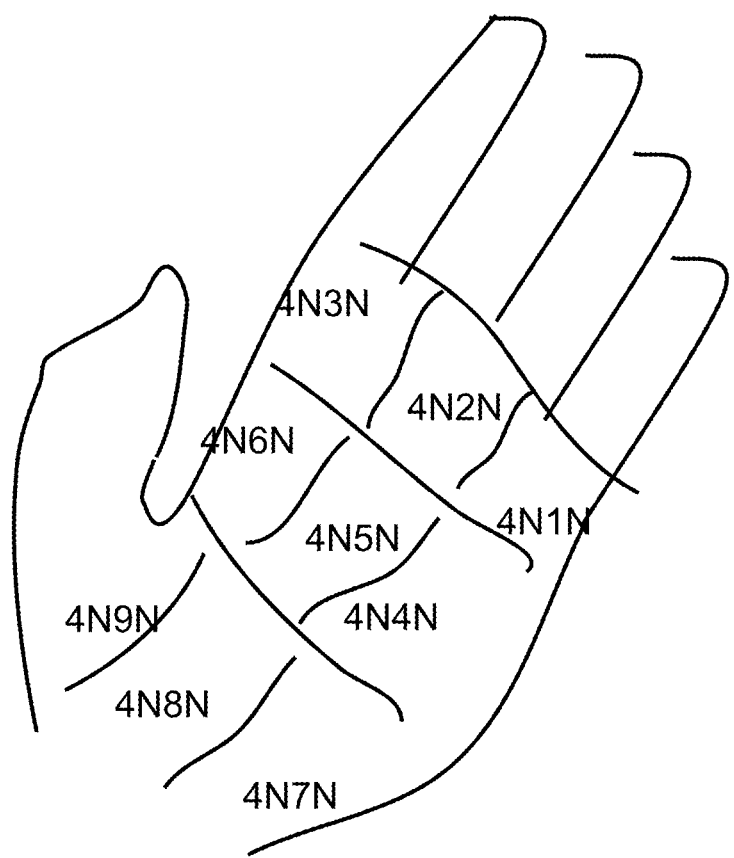
FIG. 7 identifies palm locations using the grid and pattern combinations of the letter N in lower and upper case and the numbers 1 through 9.

Palm Division Markers—The area at the base of the palm is a lowercase 'n'. The center area is identified by 'Nn', and the top of the palm is represented with a capital 'N'. If "NN" is identified, that means that the grid is going to be used to identify a specific square on the palm. The grid number is written between the N's to show a specific place on the palm (See FIG. 7).

Palm Side Indicator—The sides of the palm are identified by the numbers 1-3. The first area is the palm. This is the assumed part of the palm, so no number is assigned to this part. Next to the inside of the palm, on the side closest to the body, is the side labeled number 1. The back of the palm is 2, and the side farthest away from the body is identified as 3.

The arm is a continuum of the same system as used to identify the hand. This continuum begins with the wrist, and then moves up to the shoulder. These parts include: the wrist, forearm, elbow, tricep/bicep, and shoulder. Each part of the arm will be defined in this section.

Wrist Locators

The first part of the arm that needs to be defined is the wrist.

Wrist Identifier—The wrist area is first identified by the number 5.

Wrist Division Markers—The area of the wrist that is closest to the body is a lowercase 'n'. The middle of the wrist is a 'Nn', and the farthest away from the body on the wrist is a capital 'N'.

Wrist Sides Markers—The sides of the wrist are identified by the numbers 1-3. The first area is the inside of the wrist. This is the assumed part of the wrist, so no number is assigned to this part. Next to the inside of the wrist, on the side closest to the body, is the side called number 1. The back of the wrist is 2, and the side farthest away from the body is identified as 3.

Forearm Locators

The second part of the arm that needs to be defined is the forearm.

Forearm Identifier—The forearm area is first identified by the number 6.

Forearm Division—The area at the base of the forearm is a lowercase 'n'. The center area is identified by 'Nn', and the top of the forearm is represented with a capital 'N'. If "NN" is identified, that means that the grid is going to be used to identify a specific square on the forearm. The grid number is written between the N's to show the specific place on the forearm.

Forearm Sides—The sides of the forearm are identified by the numbers 1-3. The first area is the inside of the forearm. This is the assumed part of the forearm, so no number is assigned to this part. Next to the inside of the forearm, on the side closest to the body, is the side labeled number 1. The back of the forearm is 2, and the side farthest away from the body is identified as 3.

Elbow Locator—

The third part of the arm that needs to be defined is the elbow.

Elbow Identifier—The palm area is first identified by the number 7.

Elbow Division—The area at the base of the palm is a lowercase 'n'. The center area is identified by 'Nn', and the top of the palm is represented with a capital 'N'. If "NN" is identified, that means that the grid is going to be used to identify a specific square on the palm. The grid number is written between the N's to show the specific place on the palm.

Elbow Sides—The sides of the elbow are identified by the numbers 1-3. The first area is the inside of the elbow. This is the assumed part of the elbow, so no number is assigned to this part. Next to the inside of the elbow, on the side closest to the body, is the side was identified as number 1. The back of the elbow is 2, and the side farthest away from the body is identified as 3.

Tricep/Bicep Locator—

The fourth part of the arm that needs to be defined is the tricep/bicep.

Tricep/Bicep Identifier—The tricep/bicep area is first identified by the number 8.

Tricep/Bicep Division—The area at the base of the tricep/bicep is a lowercase 'n'. The center area is identified by 'Nn', and the top of the palm is represented with a capital 'N'. If "NN" is identified, that means that the grid is going to be used to identify a specific square on the tricep/bicep. The grid number is written between the N's to show the specific place on the tricep/bicep.

Tricep/Bicep Sides—The sides of the palm are identified by the numbers 1-3. The first area is the inside of the bicep. This is the assumed part, so no number is assigned to this part. Next to the inside of the bicep, on the side closest to the body, is the side identified as number 1. The back of the tricep is 2, and the side farthest away from the body is identified as 3.

Shoulder Locator—

The fifth part of the arm that needs to be defined is the shoulder.

Shoulder Identifier—The shoulder area is identified by the number 9.

Shoulder Division—The area at the base of the underarm is a lowercase 'n'. The center area is identified by 'Nn', and the top of the underarm is represented with a capital 'N'. If "NN" is identified, that means that the grid is going to be used to identify a specific square on the armpit. The grid number is written between the N's to show the specific place on the underarm.

Shoulder Sides—The sides of the shoulder are identified by the numbers 1-3. The first area is the armpit. This is the assumed part, so no number is assigned to this part. Next to the inside of the palm, on the side in front of the body, is the side identified as number 1. The top of the shoulder is 2, and the side farthest away from the front of the body is identified as 3.

This concludes the basic parts of locating items on the keyboard as they pertain to the physical features and area around the head, body, hands and arms. There is more discussion needed here to discuss how location is defined when using NMM's; location will be addressed again in defining NMM's. Next, the dominant marker will be defined.

Dominant Markers—The dominant marker is identified by the period symbol. The dominant side of the body needs to be identified so that the words can be written and read to comprehend which side of the body is signing or communicating. The period symbol can be used after the sign morphemes to show the nondominant side of the body or hand. The period can also be the first phoneme in the written word to show that the dominant side is being identified. If the period is found in the center of the word, both sides of the body or both hands are involved in the sign.

Touch Marker—The touch marker is identified by the colon : symbol. This symbol can also be used in lieu of the dominant marker.

Close Proximity Marker—This is used the same way as the touch, but contact is not made. The symbol is the asterisk*

Referent Hand Marker—The referent hand is identified by the 0 symbol. A referent hand is a hand that stays stationary. This marker is usually used to assist the reader in identifying previously given information.

Palm Orientation Markers—There are six main palm orientations. These are palm in, palm out, palm up, palm down, palm face toward the dominant side, and palm face toward the nondominant side. The correlating symbols are as follows:
= Palm In
+ Palm Out
< Palm Face Toward Nondominant
> Palm Face Toward Dominant
- Palm Down
_ Palm Up
\ Midway change of Palm Shift Marker—The shift marker is identified by the comma. The shift is used in the same way that syllables are given in the English language. For example in English the word elephant is pronounced el e phant. These are three different stages of saying the word. In signed languages, the shift shows the different ways to move through a sign. The comma is used to aid the reader in making these shifts.

Movement Markers—Movement Markers are defined by the way a sign is being produced or by the movement at a specific location. This would include an isolated movement, or a movement that occurs during a shift. Currently the list includes:
~ Wiggle fingers
@ Arc or Circle Movement Wiggle fingers are a flutter motion of the finger. They begin with the pinky and alternate through to the first finger moving each finger up and down in differing intervals. This movement needed its own symbol for the signs that change location from one side of the body to the other while wiggling fingers.

Arc or Circle Movements are changes in location that do not connect from the first position to the second position in a straight line. When this symbol is used, the reader that the hand will be making an arc or circular movement in space. The locations that are placed between the @ symbol are the points that need to be located within the arc. If there is only one point given, that means that the hand circles in at one point. The default for this movement is a movement circling toward the dominant side of the body.

Frozen Text Marker—The keyboard is convenient for writing sign language, because many of the words are fingerspelled. The manual alphabet in this system pairs with the keyboard, so these fingerspelled words can be typed just as they are fingerspelled. This ability to switch in and out of the English language can be done spontaneously, because this orthography incorporates the characters on the keyboard. For example instead of writing out long hand .zb1+ you could write {5} instead. These brackets around the 5 are the frozen text markers.

Timing Markers—Timing can be identified in two different ways. The first way creates a timing option by speeding up the signing. This option is done in lieu of the comma or shift marker. This symbol is represented by the
; semi colon
( ) parenthesis The second way that timing is used is by showing repetition. The parenthesis are used to show that a section of the sign needs to be repeated. This allows for ease of transcribing nouns. Timing and movement are closely related in that they each influence how the production of the sign for the other will be developed.

NonManual Markers (NMM)

Using the same considerations as listed for the Manual Markers, the NMMs were developed. The following markers are used to create NMM's. These markers are mostly used while developing sentences and questions. In this section will introduce yet another way for locating. This method of locating is used to direct the features of the body and head to create information extraneous to a manual sign. One way of isolating which locator is to use the brackets][ to isolate the feature that is being directed. For example the eyes can be isolated by using the space for the eyes 56 and 54. The eyes can be distinguished by using the dominance marker ie 56.54 Now, suppose the eye gaze shifted from looking at the person you are signing to, to setting up space. This change in eye gaze would be shown by first isolating the eyes with the location marker as in this example., [56.54] the next piece would be to write the number associated to where the eyes are being directed to. For this part, the location is divided into the area which relates to the signer's feet location. Assuming your feet are pointing in the direction of the person you are speaking to. These NMM locators are structured by coordinating two points of variance. Both of these variances range from 1 to 7. The first number identifies the direction from the dominant shoulder to the nondominant shoulder. This begins with counting 1 and in equal increments counts 2, 3, then center of body 4, 5, 6, then nondominant shoulder is number 7. Using the same principal increments are established from the ground up. The floor level being number 1 counting in equal increments upward 2, 3, 4 being directly in front of the body (bodies natural standing position) then continuing upward in equal increments 5, 6, and finally maxing the range of motion (ROM) at 7. These two number sets of seven can be used together. The first number will identify the horizontal direction and the second number the vertical. Now back to our previous example with eye gaze. Again, establish what feature will be doing the action, the eyes, by writing [56.54] and then adding the number next to the bracket, the location identifies where the eyes are looking. Suppose the eyes are looking slightly to the dominant side; by writing [56.54]3 this location is noted. If the eyes are looking slightly to the dominant side and slightly downward, [56.54]33 denotes this area. This can also be done similarly with location identifiers for the head (at the neck) and body (at the waist).

There are extra features that have been added to represent the NMMs. The tongue and eyebrows plays an important role in communicating information.
! represents the tongue
? represents lowered eyebrows
/ represents raised eyebrows These symbols are initiated at the point in the sentence or question when the NMM would begin and are marked again in the notation at the end of the duration. This feature is used in a similar way to how quotes are used in the English language.

Space bar—The following is an example of how to sign 'Where is the bathroom?' This example includes the topic marker and WH question NMM. In this example you may notice that there are two spaces between the words instead of just one. This is to assist with visual clarity in separating words.

/.t1+,(19,18,17)/ ?.d1+,(19,18,17)?

Length of Word Comparison

A comparison was noted about the length of words in this method of writing ASL. The length of an ASL written word tends to be slightly longer on average, than the equivalent glossed word in English. Below are word comparatives. The English gloss for the ASL written word is directly below to aide is noting the length in comparison.

| .t1 + , (19, 18, 17) | .d1 + , (19, 18, 17) |
|---|---|
| bathroom | where |

Length of Sentence/Question Comparison

However, when the comparison includes the completed idea, the difference of the length is even less noticeable. The following two examples are given for your viewing. The first in ASL grammatical structure, and the second in English grammar.

/.t1+,(19,18,17)/ ?.d1+,(19,18,17)?

Where is the bathroom?

/(og'3−.og'1−,+.+)/ .NN1:d'5>.d1+,'3−

I am going to the store.

Research Note and Re-evaluation of characters. At this point the following characters are not yet incorporated into this writing method, other than how they could be used as frozen text. The following are:

% Percentage $ Money

In assessing this, replacement of the bar symbol for touch was made to the : colon. This helps for ease of typing the letters, and yet the colon symbol still has a similar difference in the way the parts of the words are formed. This symbol change works well, and the visual similarity pairs well with the period for the dominance marker. The colon is presently used as the touch marker, but you will still see early research writing that used the bar for the touch symbol instead of the colon in this document.

Also, assessment of which feature of ASL is more commonly used needs to be considered; the bracket and the parenthesis are visually comparative, but the bracket allows for a more ergonomic option. The feature that is the most used between timing and isolated locations should be assigned the bracket symbol. The two features appear to be equally accessed in ASL.

*Note: The backslash was used as a timing maker to instead of the parenthesis, and the word recognition became difficult when used with the forward slash/ which is the up eyebrows.

Symbols like the percentage and dollar symbol for a feature in ASL can be done, but these symbols do not seem to be culturally acceptable to bi-lingual users. The significance of both of these symbols in the English language tends to disallow their usage in ASL for anything other than their frozen text application. Time would determine if this initial resistance to these symbols could be diminished through comfort with this written format. As to date, this remains an unknown. The benefit of having 'leftover' characters, is that these symbols may be incorporated at a later time if the need arises. This concludes the symbols and semantic correlation for defining the parameters and features of ASL to the common keyboard. The next section will discuss word formation.

Chapter 2—Building Words

Now that the characters have been identified, words can be formed. The order of the parameters for a basic word is as follows: H(l)L(z)PODH(l)LPO, These parts of a sign are initials of words that would be used to describe parts of the sign. These are listed below. This breakdown is limited and does not include the full extent that a sign can be divided into for writing words. Complex words that require more division of a sign will be demonstrated later. For now, this representation will aid in forming simple words.

H represents—Handshape for the Nondominant Hand including the capitalization for the (l) locator identifier, L represents—Location as found on the correlating grid after the (z) zone is identified for where to put the nondominant hand PO represents—Palm Orientation for the direction the nondominant hand is facing D(t) represents—Dominance and (t) touch identifier. This marker separates the dominant hand from the nondominant.

H represents—Handshape for the Dominant Hand including the capitalization for the (1) locator identifier L represents—Location as found on the correlating grid after the (z) zone is identified showing where to put your dominant hand.

PO represents—Palm Orientation for the direction the dominant hand is facing

One Handed Signs

Now for an example of a simple word, the word 'fine' written in ASL as:zb25< will be explained. The sign begins with the dominant hand only. The first three parts of the sign that are written in a font shift and italicized letters above are not used; this is because the sign begins with the dominant hand. The nondominant hand is not used in the sign, because the word begins with the dominant marker.

The rule for touch, for when the hand touches the head or body, is that the hand is moved in toward the body with the part of the hand that is closest to the body (after the palm orientation is established) making the contact. Since the thumb is closest to the body in this position, the tip of the thumb is touched to the body.

The sign 'fine' starts with the touch symbol, but note that you have to know the next features of the sign before you are ready to place your hand and make contact. So, in reading this word—fine :zb25<, we would make a mental note that after we receive the next pieces of information, we will have the hand touch the body.

After reading the dominant marker, then the five handshape is made from the written part of the word zb being read. Note that the zb is lower case letters. This is showing that the grid we will need to visualize in our mind will be the grid that is seen in the body locator.

Next you look to the location. The numbers 25 are used to identify the location; the body locator in the Fine Zone, because there is not an apostrophe before the body locator. This informs the reader that the location is in the body zone, again because the lower case letters are used for the handshape symbols.

Finally the palm orientation; this is the hand facing to the nondominant side of the body. This concludes the pattern D(t)H(l)L(z)PO for reading the word. This word can now be pieced together.

The dominance marker is the touch symbol:
The handshape is the 'zb'. The sign is created in front of the body, so the handshape is lower case.
The location is in the middle of the chest. This is the 25 area, and in the Fine Zone. That means no apostrophe is written. Also writing 25 will suffice, because the sign taking place anywhere in this vicinity will create the same meaning.
The palm, in the Fine Zone, has the fingers up as in the sign 'fine' (See FIG. 3). The palm orientation is facing toward the nondominant side with the < symbol.
When this is put together, :zb25< is read by taking your dominant hand in the shape of a 5 (showing all five fingers spread open) is located in front of your chest with your palm facing toward the nondominant side of your body; then you move your hand inward and have the tip of your thumb touch your body. At this point, you have just read and signed the word 'fine':zb25<.

Now let's examine the word 'mother':ZB85<. This is the same touch marker which shows the dominant hand and the same handshape. The spelling denotes a different location, but in the same zone. The same palm orientation is also identified in this word. This word will use the same pattern D(t)H(l)L(z)PO. However, some differences occur when putting them together. The handshape is now capital letters to show that the sign is in the head locator area. The exact area, as found on the Head Locator, is the chin or 85. With everything else the same, this means the word is written as :ZB85< and read by again using the 5 handshape with palm turn toward the nondominant side of your body. Your hand near your chin is moved in to make contact. Now you have read and signed the word 'mother':ZB85< in American Sign Language.

Lastly, the word 'father' is written :ZB52<. Again, many of the features are the same. Take a minute to look at this one and see if you can read it.

If the hand position is changed, the rule about the closest part to the body would still apply. In the word 'my', the parameters are all the same as in the word 'fine', except for the palm orientation. The word 'my' is done with palm turned in toward the body. This is shown with the equal symbol =. This word is written as:zb25=.

Now to review the word comparisons. See the words below:

| My | Fine | Mother | Father |
|---|---|---|---|
| :zb25= | :zb25< | :ZB85< | :ZB52< |

Next, an example of a word that uses the dominant hand, but the hand does not touch the body.

This example will demonstrate the classifier sign for a vehicle. This is executed by making the 3 handshape (like the 5 handshape, but the pinky and ring fingers are brought into the palm area of your hand). The sign we will be making will show the vehicle 'parked'. The flexibility of the language can create an image of the vehicle parked in any location, but for simplicity sake we will begin with the classifier representing a vehicle parked in front of us and just to the right. This sign is located in the 'car' one zone. Again, this classifier handshape could be established in any location, but for this example the 4 area in the body locator will be used. This classifier handshape is showing the vehicle positioned in a way that the vehicle would appear parked with the front of the car, your fingertips, in the position where if moved, the sign would represent a vehicle driving forward and the sign would move away from your body. This means that the palm is facing toward the nondominant side of your body.

Breaking down the word: D(t)H(l)L(z)PO
The dominance marker would be written first. The sign does not make contact, so the period would be used. The handshape is the 3 handshape or "KU". Since this is being placed in front of the body, the letters will be lower case. The location is in area 4, and in the car one zone. To make the vehicle represent a parked forward position, the palm must be facing to the nondominant side. This signed word is written as
.ku'4<

The above examples are simple words because they do not include what typically would be called a movement. In this writing method, what typically would be called movement can be described as a shift. A shift is defined as a change in handshape, location, or palm orientation. The shift can be done at a regular pace or a fast pace. For the first example, the normal paced shift with a comma. Consider the word 'French'. This sign is made with the dominant hand with an 'f' handshape in front of the dominant shoulder. The palm is facing forward (away from the body), then the palm shifts inward (in toward the body).

The breakdown is formed by DHLPOSPO. This breakdown represents the usual Dominant marker, Handshape, Location, and Palm Orientation, but now a Shift is added to show a changed Palm Orientation. This translates to .f1+,=.

Another example of a shift that changes handshape rather than palm orientation is done in the word 'no'. This sign is used with the same breakdown except the shift changes the handshape. This is noted by the SH seen at the end of the breakdown of DHLPOSH. This word begins with the 'H' handshape, and then becomes the closed 'h' handshape, also known as the "HO" handshape. This word would be written with lowercase letters in the body locator 1 area, and also in the Fine Zone. The palm is facing down toward the ground which is written with the hyphen. Hence, this word is written .h1-,ho. In these examples, only the piece of the word that is altered is written after the shift. That means that the other parts of the word stay the same; the other features of the sign do not change.

Two Handed Signs
Now that we have seen how to write words with a single hand, we will explore how to write words that have both hands in the sign.

Most two handed signs include shifts. First let's look at signs that have the same movement. These examples will include similar sign production between the dominant and nondominant hands. For the first example the word 'happen'. This word is formed with a 'd' handshape on both hands. The hands face toward each other, and then they both move to the palm down position. This is done in the Car One Zone with hands perpendicular to the body in the 6 and 4 body locator areas respectively with the nondominant and dominant hand. The breakdown is as follows: H(l)L(z)PODH(l)LPOS(t)PODPO The S represents the shift. The comma is used as the shift symbol unless there is a (t) timing piece. The timing for a fast shift is represented with a semicolon;.

This means word 'happen' is written d'6>.d'4<,-.-
Notice that the dominant marker is used twice. Once in the initial part of the word to set up the hands in their positions, and again after the shift to identify which hand is making the change from the initial part of the sign. If just one hand has a shift, the dominant marker is used to show which hand is effected in the transition. If just the dominant hand is shifted, the word is written with a comma to show the shift, and then the period to show the dominant hand. If the nondominant hand is shifted, the period would be used at the end of the word to show the nondominant hand was altered.

The above example of the word 'happen' shows that both hands are shifted.

Two Handed Signs with Timing

For a second example, consider the word 'sell'. 'Flat 0' handshapes palm in shift to palm down. Both hands are in front of their coinciding shoulder. The hands move simultaneously. 'Flat 0' is written with the 'GO' symbol. The letters would be lowercase, because the hands are in the body locator area. The dominant hand is in the 1 area in the Car One zone. The nondominant hand is in the same zone but in the 3 area. The palm down symbol is the hyphen and the palm in symbol is the equal sign. This word, sell, is written go'3=.go'1=,-.-. Now if this same word is signed twice, the word representation means 'store'. ASL typically has verbs signed once and nouns signed twice. To show the sign being done twice, the timing marker needs to be used. The timing marker isolates the part of the sign that needs repeated. Parenthesis are used at the beginning and end of the word go'3=.go'1=,-.-'sell'. Hence, the sign 'store' is written (go'3=.go' 1=,-.-). In this example the breakdown is written TH(l)L(z)PODH(l)LPOS(t)PODPOT. The T represents the timing portion of the sign. This kind of timing is used often to identify nouns in ASL.

When the hands both have similar shifts, the sign is simple to write. The word breakdown becomes more complex when other features are added. These other features occur in a variety of signs. The next section will discuss these complex signs.

Complex Two Handed Signs

Complex signs include signs where the hands do not have similar parameters with each other as in 'store', but instead the hands have different parameters as they relate to each other as in 'tea'. Another complexity of writing a two handed sign occurs when the hands either touch each other, or become very close to touching. These complex signs will be introduced in this section.

Hands Touch Together

Touch is an important feature in creating signs. Contact signs are used in words like school, friend, house, and many others. The breakdown for the order of parameters is worked into the previous method of TH(l)L(z)PODH(l)LPOS(t) PODPOT. The only change is that spelling of the word needs to include the hands touching each other. The breakdown for this specific part of the sign is as follows (t)L(fs)NL(di)DL (fs)NL(di)(t).

This entire new breakdown just listed replaces the Dominant Marker in the previous method. For example the sign 'friend' is made with the 'x' handshape on each hand with both hands touching in the crooked part of the 'x'. This sign simulates two people hugging each other. This occurs in the 28 position in the car one zone. The first half of the sign is created, then shifts to the second half. The first half is signed H(l)L(z)PO(t)L(fs)NL(di)DL(fs)NL(di)(t)H(l)L(z)PO the second part of this sign breaks down the same way after the shift. Hence the breakdown for the full word is H(l)L(z)PO (t)L(fs)NL(di)DL(fs)NL(di)(t)H(l)L(z)POSH(l)L(z)PO(t) (fs)NL(di)DL(fs)NL(di )(t)H(l)L(z)PO Replacing the parameters with the correct notation the word is written x'28_:Nn1.Nn1:x'28-,-:Nn1.Nn1:_

The breakdown shows all the parameters, but only the parameters that change need to be written after the shift. The newly added touch portion of the sign does not have a L(fs) because the palm side of the hand is assumed. The 'Nn' refers to the midsection of the finger, and the 1 is the L(di). L represents location and (di) represents the digit indicator. The 1 is the first finger or finger pointer.

The sign also has balance in that the location must be the same for both hands when the hands are touching. The sign 'friend' has contact in the '28 location.

Hands in Close Proximity

The touch (t) can be replaced with the close proximity (cp) symbol. Since you either make contact or you don't, meaning you just come close to an area but don't touch, the symbols never appear at the same time. The (cp) would replace the (t) or visa versa. Now let's examine the sign 'tea'. The sign 'tea' is made with an 'o' shape on the non dominant hand in the car one zone 5 location, and an 'f' handshape on the dominant hand that traces around the 'o' on the nondominant hand. The tracing does not make contact, but comes in very close proximity. The breakdown for this word would include a transition in the close proximity marker. This sign also includes the 'at' symbol @ to show that the movement is made in an arc or circular motion. This sign is then repeated. Let's write the word.

(o'5>*@1n1,Nn,N,N5,n,4Nn1.NN15@*f'5-)

Interesting to note, the words are read toward the middle of the word. The sign parameters are positioned so that they are separated by dominance. In order to read the word you position the non dominant hand first, and then the action typically takes place with the dominant hand. In the sign 'tea' written above, the position for placement of the dominant hand is identified by writing the location of where to position the dominant hand as the sign proximity relates to the nondominant hand. The thinking process in reading this sign would require the reader to look ahead to see what hand shape is being used on the dominant hand, the 'f', and which part of the hand is coming within close proximity, the NN15. This thinking process requires reading from the left to the dominant marker, and then finish by reading from the right side of the word to the dominant marker. These two halves meet somewhere in the middle portion of the signed word. When your eye reaches the dominant marker a second time in the word, the concept can be signed. The sign has parenthesis, so the sign is repeated.

Also noteworthy is that the different locations for close proximity include the arc movement. This is written in the same way that quotes work in English. The @ is written to identify where to start the arc movement, and then written a second time to show the completion of the arc movement. In the case of the word 'tea', the movement is complete when the sign has completed a full circle. The commas are used within the close proximity identifier to show the change in position on the nondominant hand. Just as the shift does not require repetitive parameters be written, the parameter is not written unless changes occur. 'Tea' changed from the first finger, to the fifth finger, to the palm side on the nondominant hand. These shifts were identified by including the corresponding numbers.

These two examples are good representation of writing complex words, because the breakdown of the writing system seen in each example apply to the process of writing the words. In other words, the close proximity can have shifts as shown in the word 'tea', but the sign could also use the shift to show a continual touch. Almost all of the signed words will fit within the parameter breakdowns we have reviewed up to this point.

Typically the hand can be positioned in a contact sign by identifying the location and allowing the closest part of the hand to move in toward the body to create the touch. Some words will need to identify which part of the hand comes close to the body or touches it. In these special cases the location on the hand would need to be called out. For example the word 'kid'. This sign is made by placing the lower part of the dominant pointer finger of the JO handshape under the nose. This is written (.1n1:HO[825]–,+),–

These words need to be detailed to communicate a specific concept. For these special words a new locator method was introduced.

Exact Detail Word Locators

Figure 8:
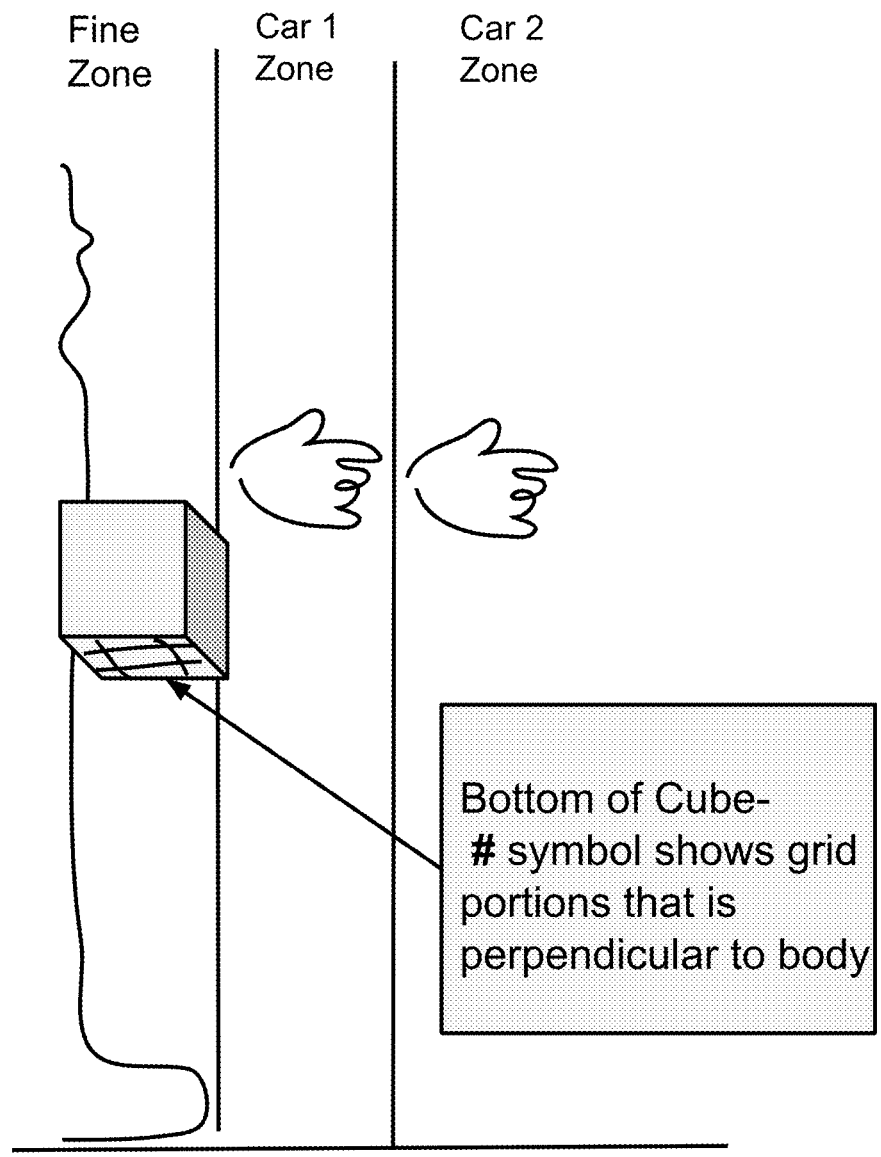
FIG. 8 is a drawing of the zones depicting a division of a cube. The bottom of the cube shows how the pound symbol represents a grid division perpendicular to the body.

Some signs must show precise positions. For example if a reference hand is being used to show that something is very close in proximity, ie a building in relation to a tree that is located near the front door of the building. This type of sign needs a second side to the zone area to create a space location that is perpendicular to the body or maybe better identified as parallel to your feet. Imagine the area of each grid square within the zones as a cube. We have been using the space parallel to the body, as if we are contacting an imaginary wall in front of us. But now imagine an isolated cube. Suppose you image the cube for the location 5 in the body locator. Now picture the bottom part of this cube (See FIG. 8). In order to identify the bottom area of the cube, the cube base can again be divided into a grid area of 9 squares. By placing the pound or hash symbol # in front of the number, you are asking the reader to view the bottom part of the cube. This type of detail would most often be used with classifier signs. Most of your standard signs won't need this kind of exact detail to still create the meaning intended in the sign.

Chapter 3—NonManual Markers

In Chapter 1 we identified some of the keys that would be associated with NMMs. For review, these keys are listed again here.

! represents the tongue
? represents lowered eyebrows
/ represents raised eyebrows It is also a good idea to review the keys that identify specific facial features. These are found in the head locator grid. They have been listed again here.

285 Top Hair
515 D.Forehead
535 ND Forehead
525 C Forehead
551 D. Eyebrow
553 ND Eyebrow
548 D.Eye
568 ND Eye
469 D.Temple
537 Money Spot ($)
646 ND Temple
587D.Nose
589 NDNose
588 Tip Nose
822 Under Nose
821 D.Nostril
823 ND Nostril
827 D. Top Lip
828 Center Top Lip
829 ND. Top Lip
85 Mouth
851 D.Bottom Lip
852 Center Bottom Lip
853 ND .Bottom Lip
858 Chin
733 D. Top Jaw Line
873 D. Bottom Jaw Line
911 ND Top Jaw Line
891 ND Bottom Jaw Line
815 D.Cheek
835 ND Cheek
875 D.Neck
895 ND Neck
885 Center Neck The above list of head and facial features are parts of the face that can be located by using the brackets][ to specify the exact location of the feature. Once the feature is identified, the direction or positioning can be established by using the grid or orientation symbols within the brackets. This can be positioned in a sentence or question to create meaning. The list above is a good identifier list, but the list is not all inclusive. There are other NMMs' that need to be included in order to have a complete list. These other NMMs' will be add and analysed next.

The Mouth

There are several features that can be identified separately when considering the mouth. Typically, these features are listed by specific 'movements'. These NMMs on the mouth are commonly identified as 'cs', 'cha', 'th', 'pah', 'sta', 'fsh', 'mm' and 'oo'.[2] These letters correspond to the sounds that are made when the mouth shapes are made.

Now the mouthparts need to be considered. The mouth has a tongue, jaw, cheeks, lips, teeth and air. All of these parts can be used in different combinations to create different meanings. They can also create different meanings as an isolated feature. To make this even more involved, any of the features can be combined with a MM at a specific point in time to add meaning. There are many ways to combine these features. Showing all of these combinations is not necessary; however, the system must be capable of writing the possibilities.

To start, the mouthparts need to have correlating symbols. The above list identifies most of the mouthparts, The Lips
827 D. Top Lip
828 Center Top Lip
829 ND. Top Lip
85 Mouth
851 D.Bottom Lip
852 Center Bottom Lip
853 ND .Bottom Lip The Cheeks
815 D.Cheek
835 ND Cheek The Jaw
733 D. Top Jaw Line
873 D. Bottom Jaw Line
911 ND Top Jaw Line
891 ND Bottom Jaw Line but this list does not include the teeth, air, and tongue. The tongue has already been correlated to the ! exclamation mark symbol. So what we have left are teeth and air. The 'air' can be correlated to the dominant marker and timing markers, because their functionality corresponds. The cheeks are involved when the puffed cheeks blow out, and sucked in cheeks suck in air. The best way to identify the teeth is to have a correlating symbol. The prime symbol ' represents the teeth.

Now let's correlate the parameters of a sign to the mouth. Which mouthparts move? The tongue, jaw, lips, air and cheeks all move. Only the teeth are stationary. Now analysing which parts can be touched, all of the mouthparts except air can be touched. The consideration of how parts move and can be touched also need to be thought about at this point. The jaw moves the mouth open and shut. The jaw is also capable of moving only the lower jaw side to side. The lips can also be pulled back above the teeth, or pushed downward to cover the teeth. The tongue can be moved to every part of the inside of the mouth, plus the tongue can move outside of the mouth. Positions of the tongue include curling up to touch the nose or down to touch the chin. The tongue can lick the lips. The tongue can touch things or be touched. Like the tongue, the teeth can be touched and can touch (bite). The teeth can also be identified on a dominant side or a nondominant side. The lips rather than the teeth are seen in the head locator diagram, so no number is specified for the teeth. To compensate for this, the teeth associated with the lips. If the lips number is called out, which can be dominant or nondominant, and the prime symbol is added, this means that the teeth are being identified.

Suppose that the tongue symbol, exclamation point, is used to identify that the NMM involves using the tongue. The NMM is developed in a similar way to the written word. Instead of using the handshape, you use the tongue symbol. The next parameter to identify is if the tongue is going to touch another part of the body or just make a movement. The tip of the tongue is always the focus for action, unless there is two exclamation points, then the tongue second position is assumed to be the action; that is the area just past the tip of the tongue. The perspective of the tongue is thought of from the inside of the mouth outward. Physically speaking, the cheeks could not be touched by the tongue unless the teeth are opened. If the teeth are the body part to be touched by the tongue, the location is given by how the tongue relates to either the cheeks or the lips. The initiator of the contact is the item that is called out second. This correlates to how the hands interact together. The nondominant hand is identified, and then the dominant, action-hand, is identified second. The written form also assumes that the tongue will touch the teeth where the tongue is visible to be seen, since there is no meaning if not visually represented.

How the lips, jaw and cheeks are positioned directly impacts the actions made by the tongue and teeth. Possibilities are going to be listed here. This first section correlates to the orientation of the jaw. The jaw can be closed 'jj' or assumed position, open slightly 'j' moderately opened 'Jj', opened 'J', or opened widely 'JJ' If the jaw is open, the teeth are spread; the lips may or may not follow the teeth/jaw. The lower jaw can also shift to the left or right at any open position except for the first, jj, and the last, JJ. These shifts can be shown with the same directional orientation markers that is used for palm orientation the < > symbols. The jaw at the second position, j, can also move forward. This is shown with the + symbol.

The comma can be used to show shifts in the mouth movement. This will indicate if different mouth feature or morphemes, for example the lips, change positions while the NMM is produced.

Let's explore the lips actions some more.
The lips can be
  OO—Pursed—held together tightly
  CS—move one side of the mouth
  CHA—held out away from the teeth
  P . . . Filled with air behind the front lips
  . . . AH—rest position on teeth
  MM—lips pooched out forward
  O—like pursed lips but lips make a small o shape
  Raised upper lip
  Pulled back upper lip
  Pulled back bottom lip
  Protruded or pouty bottom lip
  Upper lip wrapped around upper teeth
  Bottom lip wrapped around bottom teeth The lips must follow the jaw action after the jaw opens to the third position or Jj position. The lips may be closed with the mouth open in the j position. Also noted, the top lip may do something different than the bottom lip, or the side of the mouth/lips can move on one side but not the other (CS)
  P—air behind front lips
  (pc)—puffed cheeks and can have dominant or nondominant
  S—air through teeth
  O—air sucks in
  CS—air sucks in through side of teeth
  Clench—air sucks in through all teeth
  ST—air pushed through front teeth with tongue
  AH—air pushed out by jaw
  CH—air pushed over top of tongue from back of cheeks
  SH—air pushed over top of tongue
  F—air pushed between upper teeth and bottom lip Air can also suck the cheeks in. The cheeks can also be raised or lowered in regard to dominant and nondominant sides of the head. This can be shown with the - and _ symbols. For clarity, each location would need to be called out before the orientation symbol to correlate which body part is producing an action.

The period is used to show air is blown out, and the colon shows the air is sucked in.
  The + shows lips out
  The = shows lips in The break down for the NMMs of the mouth morphemes is listed below—
(t)/(cp)![L(ck)O]J[OL(lp)AL(lp)O](timing)

These initials and symbols in this breakdown correlate to the following words.
(t)/(cp)—(touch)/(close proximity)
!—Tongue
L—Location
(ck)—Cheek
O—Orientation
J—Jaw
O—Orientation
L—Location
(lp)—Lips
A—Air
L—Location
(lp)—Lips
O—Orientation Now Let's Try a Few The CS: dominant side sucks air in through the back teeth, teeth barely open lips open only on the dominant side and dominant side cheek is raised. Tongue does nothing.

[57_]j[+827:853+]

The above word shows the cheek zone [57] is raised by the _ symbol. The lower case 'j' says the jaw is barely open. The lips on the dominant side of the mouth are identified by the 827 and 853 that are in the brackets. The numbers are separated with a colon or period; these symbols identify the airflow through the mouth. Finally, the + symbols represent that the lips are protruding away from the teeth. Only the dominant side is identified, so the nondominant side has no changes.

The next NMM demonstrated here is the CHA: the action takes place in the middle of the mouth. Air is blown over the tip of the tongue. This is a two part NMM with the action starting with the jaw closed, and the lips raised or protruding away from the teeth. The air is blown out, and the jaw position changes to the third position Jj. The lips do not change orientation. The cheeks and tongue are not recognizable in this example.

jj[+828.852+],Jj

The next example will show the semantic of FSH— This one includes more parameters. The NMM is created by having your upper teeth cover your lower lip, then while blowing out of the mouth so that you are making the sound. The sign shifts to the jaw closed shut with the lips protruding away from the teeth while still blowing out air. The initial part of this NMM has the upper teeth cover the bottom lip even though the top lip is protruding forward the whole time. The touch in this NMM is the front teeth on the upper jaw having contact with the lower lip.

j[+837':853=],[+837.853+]

This is first showing the jaw position j, then the locator 837 with the + symbol shows the lips pooched the teeth prime is used to signify the teeth are touching. The touch : replaces the air symbols—the period and semicolon—to show the top teeth touch the lower lip. The equal symbol is used to show the bottom lip is pulled in/covers the teeth. The shift, is used to show the second part of the NMM. The 837.853 with + symbols show the lips both pooched and the air blows out. as shown by the period symbol. The jaw remains the same so no reference change is needed.

Another occurrence in American Sign Language can happen on the mouth. The signer can sign a word and mouth the English gloss for the word. The fingerspelled word {Jayme} can be both on the hand and said on the mouth. To create a spoken word on the mouth, the tongue symbol can be included in the frozen markers. {!Jayme} would show that this word is being said on the mouth as well as fingerspelled. To include a tongue symbol in the front and back of the word shows that the word is only mouthed. This is shown in the example {!Jayme!}. This feature can be used as a shortcut to identifying NMMs on the mouth. {!fsh!} can be used the same as the above example written in ASL j[+837':853=],[+837.853+].

This feature gives the ability of the signer to lexicalize their signing and Nonmanual Markers. It also would lean toward the characteristics of the signer to show ASL features in their signing as compared to a signer that uses more Signed English features. This writing method will accommodate the preferences of the signers.

The above examples show how using the same system of symbols is capable of creating NMMs on the mouth in a variety of scenarios. Next we can move to identifying the movements of the eyes.

The Eyes

The eyes have several parts to consider; these are the eyebrows, eyelids and eyeballs. To begin we will consider the eyebrows.

The Eyebrows

The simple way to identify the eyebrows, is to do eyebrows up (/) and eyebrows down (?). The symbol initiates when the action is started and is stopped when the symbol is shown a second time. This works similar to how the quotation marks work in English. The following example shows how the eyebrow markers are used:

/.t1+,(19,18,17)/ ?.d1+,(19,18,17)?

The above example shows the eyebrows raised for the topic marker of a dominant hand 't' shape in the body locator 1 potion with palm out shifted to move from the 19 to the 17 and back again to repeat the movement. This is the sign for bathroom/toilet. The next word is done with the eyebrows down. The dominant 'd' handshape in the same location with palm out is shifted in a similar fashion as the previous signed word. This is also repeated. This sign is the written form of the concept for 'where' when combined with the lowered eyebrows. The eyebrows written like the signs in the above example. The eyebrows do not need to be done with another non manual. Just like the mouth movements can be isolated. If the // is written that means the eyebrows are raised as an isolated movement.

There is the possibility that the eyebrows can be moved individually rather than together. If this is the case, the eyebrow locator number on the head would be used to identify which eyebrow. The symbol would then be included with the locator to show the action that the eyebrow is doing. The up down symbols are used in this case. The dominant eyebrow is 551. If the eye moves in an isolated manner, the non manual sign is written as [553.551_] or [_551] This would depend on the emphasis of the meaning.

The Eyelids

The eyelids can be shut, squint, resume a normal position or strain to be open very wide. The eyelids are not assumed in the Head Zone Locator. This is similar to the teeth and tongue in that they are there but not visibly identified unless specifically called out. The eyelids can also be isolated to be positioned in differing ways. For example, the left eye can wink or vise a versa. Something else to consider when discussing the eyelid is the eyelashes. The area to touch should always be determined by the fingertip. For this reason the eyelid follows the pattern of the grid of the eye itself. 548 is the dominant eye pupil or center area. Just like the teeth, this can be switched to identify the eyelid by using a prime. '548 would signify the eyelid center. '549 would be the eyelid area closer to the nose, etc. The eyelashes are identified by adding a symbol marker of the ^ up arrow marker. Since the eyelashes do not move, this would be used only to show a locator variance for a touch or close proximity marker. :d[^549]=

This is assumed for the resting position of the eye open. But suppose the eye is closed 'e', squinting 'Ee', or open wide 'E'. This differences will change how the nonmanual and manuals interact. For example the sign written :d[^E549]= would touch the center of the eyelashes of the dominant eye with the dominant hand with the eye wide open.

The eyes could be shown as winking by writing [e56.54]. In this example the nondominant eye winks. [56e54] shows both eyes closed. [56ee54] shows both eyes closed tightly.

NMM Location Positioning

The next few features are directly associated with the location of the NMMs—The Eye Gaze, Body Shift and Neck Movement. This location system is specific for NMMs; this location system works different from the grid system used to identify the head and body. It is also different from the hand and arms method for locating specific parts of these extremities. The system is setup to accommodate the way signing space is used. The space is based on the pivotal functions of the specific body parts previously listed. All of these body parts, eyes, body, and neck, pivot in a similar fashion. The position change creates a focal point for the sign and for the 'reader'. The signer may shift focus to pause and tell the viewer/reader specific information. The shift may be used to create an image of direction for dialogue. It can also be used to set up space for objects such as building, people, things; this would also show the interaction of the objects and the detailed information as it relates to the nouns ie verbs, adjectives, etc.

Typically the signing space divides the area of focus into 3 or 5 areas; in an effort to expand the possibilities to the extreme, the division for this writing method will use a division of 7.

How does this Work?

The signer is typically positioned directly in front of their 'audience'. While signing the signer may turn slightly to the right to talk about a specific category, then the signer may turn directly to the viewer and sign a different category, and still again the signer may shift slightly to the left to discuss yet another category. This turn from right to left or dominant to nondominant sides can be counted out. The very farthest dominant side is labeled number 1. Moving toward the nondominant side slowly, the next over is 2 next to it in a continuation is 3. 4 is directly in front of the signer. Continuing in the same manner the next is 5, and 6, and then completing the positioning in the farthest non dominant position as number 7 (See FIG. 9).

In a like manner the head, eyes and body can pivot up and downward. Again, the neutral position is straight ahead and is number 4. Moving up from neutral would count out 3, 2, 1, with one the extreme of up. 5,6,7 would move downward with 7 the extreme position in the downward count (See FIG. 10).

These two positioning counts are used in showing/identifying where the body position is focusing. The first position called out is the side to side position, and the second number is the up and down position. The individual body parts will be considered in the next sections.

The Eye Gaze

The eyeball is most significant; it creates the communication made with the eye gaze. The eye gaze communicates where things are located in space, and also establishes what is the focus or priority in the signing zones. The eye gaze can create the first person, second person and third person speaker. When it is combined with other classifier features, it is capable of becoming abstract; for example this would occur in signing with personification.

By writing the eye location, you establish the subject. For example writing [56.54] shows that you are talking about the eyes. To immediately put another location next to the eye location as in [56.54]3 shows that the eyes are being shifted slightly to the dominant side. If two numbers are used after the identifying location as in [56.54]31 This shows that the eyes are being shifted slightly to the dominant side again, but now the 1 shows the they are also shifting to the up extreme vision line. This position would possibly be used for looking to an airplane or some other item that is placed overhead.

Unique to the eyes is the ability to show distance. The eyes can appear to look far in the distance, or directly in front of you. To show the depth of the vision line, the zone markers can be used. The same rules apply as in the grid zones. An apostrophe designates the Car One Zone, the quotation is the Car Two Zone, and the absence of a zone marker assumes the closest zone—the Fine Zone. An example is [56.54]'53

Another feature for establishing eye gaze can be used with the eyes being 'locked on' to a position. This would be significant when a referent hand is being used. The zero symbol is used to create this effect. In this example the method works as a shortcut. Instead of specifying the referent being used, the zero would identify it. Here is an example
[56.54]0

This would not have meaning unless the hands had established the meaning attached to the gaze prior to writing this NMM. A zone would not be needed with type of gaze, because the location is specific and dependant with the referent location.

The Neck Pivot

The head turning also emphasises the meaning in signing. By using the system established above for focusing on positions in the signing space, the neck can pivot the head to create meaning. By identifying the neck, [885], you can again add the numbers to show the head where to be positioned. For example [885]1 would turn the head to the far dominant side. [885]17 would turn the head to the far dominant side and downward.

The Body Shift

Similar to the head turning, the body will turn in relation to how the waist is positioned. Using the method above, and the symbol for the lower waist region [882] the body can be positioned. For example [882]45 would be positioned directly forward and slightly down. The positioning is obvious because of the numbers listed after the identified body part.

A short cut can be used by just locating the [88]. This location would be used if both the head and body make the same position. This can be done by writing [88]45. This means that both the head and the body position slightly downward.

Chapter 4—Putting it all Together

If the intention of the speaker is to draw the attention of the head, body and eyes to a certain signed word, the & symbol can be used first to communicate that the NMMs are drawing attention to, and the specific location would be called out after. For example &[.d'5<]. This symbol can also attach specific non manual meaning to a sign by writing the & to connect the pieces NMMs and MMs together. The concept of 'far' has eyes squinting, mouth open and head tilted back for the NMMs. The sign has the handshape move from close to the body to far in front of the body.

Breaking it down it is written [56Ee54]&{!ah!}&[885]46&.d1+,"4−

In this example of the signed word 'far', you can see that the NMMs are listed from the top of the head downward to the waist. The eyes [56Ee54], mouth &{!ah!}, head(neck) &[885]46, and body(hands).d1+,"4− is the order for connecting the different morphemes. The & symbol shows the timing of the morphemes; in other words, it shows they happen at the same time. A raised or lowered eyebrow can be written two ways. The short method is to use the symbols that were identified previously as the forward slash and the question mark. The alternative method is to show the eyebrow location [_553.551_] or just [55_] if the movements are the same. The difference between these two methods of writing is the rules that associate with them. The forward slash and the question mark would need a repetition of the symbol to show that the action is completed. In the alternative method, [55_], the action stands alone. This second method can also be attached to another NMM or sign by adding the ampersand symbol. This second way of writing the eyebrows could be used to show separate movements. If just the dominant eyebrow is raised you write [553.551_]. In the same way if just the non dominant eyebrow is lowered you write [−553.551]. The [55] location with a movement would only occur on with the head locator, because the location on your body is your belly button region which does not move.

Example:

d'2=*NN1.NN1*d'2+,+.= the sign for 'hurt' can have the lowered eyebrow added with the ampersand as in

[−55]&d'2=*NN1.NN1*d'2+,+.= this shows they happen at the same time.

Example 2:

?d'2=*NN1.NN1*d'2+,+.=?

In Example 2, the eyebrows are started in the lowered position; when the sign is completed, the symbol appears a second time to show that the lowered eyebrow stops. This difference in these two examples are slight, but it allows the writer the flexibility to say the words in the exact manner intended.

These examples show a signer asking a 'wh' question about the someone or something that was or would become hurt. In English the equivalent concept could be—How did/will the pain happen?—This combination of sign and NMM would typically be used to seek more information about what would or has occurred.

/.AL     [841]+:NN5,@84,75@/     .d'[28]>:NN1 (.OG[852]=*NN12345) .D[841]+:NN1,=,+ .d'[28]>:NN1

The above sentence shows the eyebrows raised to initiate a new topic. The AL is the handshape used. The period prior to the AL shows that is the dominant hand. The [841] shows the exact location the + shows that the palm is facing out or away from the body. The colon shows that the action touches. The NN5 indicates the fingertip part of the thumb. The comma shows a shift occurs. The @ symbols show the area that is shifted in an arc movement. The 84 is the initial location; the 75 is the ending location. This complete sign is then followed with another eyebrow raise symbol to show that the action is complete. In other words the eyebrows can resume the natural position.

The next part of this sentence is started with the dominant hand again. In fact this whole phrase is only using the dominant hand to sign the statement. The position is in the Car One Zone with location 28. This is the upper center chest region of the body. We know it is the body region because of the lower case letter 'd'. The palm is facing toward the dominant side of the body. The colon shows it is touching and the NN1 means it is the tip of the first finger. This completes the second sign in the sentence. This sign and the rest of the signs in this sentence do not have NMMs.

The third sign repeats itself as seen by the parenthesis. The dominant hand makes the OG, also known as the flat o, handshape in the head area, because it has upper case letters. The location is 852 with palm in, as noted by the equal symbol. The asterisk shows that it is coming very close to but not touching the 852 location-which is the mouth. The part of the hand that comes close is the NN (tip of finger/s) of the 12345 digits. This would be all of the fingers and thumb.

The fourth sign is also the dominant handshape which was used in a previous second word signed, but the D is capital which means it is made in the head locator area rather than the body. The [841] location is used again; this was also used in the first sign in this sentence. This time the touch is made with the tip (NN) of the 1st finger. The hand shifts from palm out (+) to palm in (=) and then back out again(+).

The last sign in this statement is the repetition of the second sign. It is the deixis or indexing to show that the speaker has completed their thought. The English glossed equivalent to the above ASL sentence would be—
YESTERDAY ME EAT CANDY ME A translation in proper English might say—
I had some candy yesterday.

These written ASL sentences and questions are able to be written with clarity and precision. The written method allows the signer and reader to recreate the signs exactly as they were intended. The next and final section will discuss the tests and findings of this writing method.

Chapter 5—Testing Methods and Findings

Several methods of testing this writing system were put in place to determine how effective this writing system is in successfully communicating in ASL. The first method was to actually try to write common words in ASL. The second method was to teach hearing students, who did not know how to sign, the written method. The third was to teach Deaf adults. These efforts were used to detect possible defects in the writing system, and also to observe the easy of learning the system. The following will explain what occurred and the findings that were derived from it.

Writing Words in ASL

The best way to see if the system was successful was to start a dictionary. Amy, an intern student from a local university, was dedicated to assisting me in my research efforts; we would meet weekly during the 2012/2013 school year. The initial phases toward the development of the dictionary went slow.

The work involved in this project initially consisted of the following:
Analyse ASL signed words for production variance.
Recognize and Record signs in relation to their—Movement, Palm Orientation, Location, NMM, Handshape, Eye Contact, Timing and Touch
Develop journal and/or documentation of analyzed vocabulary Amy was taking second year coursework in ASL. She would present questions to me as in regards to identifying the locations, handshapes and palm orientations. The movements, touch and timing feature of the language were not yet complete, so Amy would make notes and questions for consideration on how to move forward. Touch features that included the hand and arms were just starting to be designed. The time developing the dictionary was extensive and minimal effort to develop NMMs was made during this timeframe.

One finding that was notable during this timeframe occurred when Amy noticed that left-handed signers would use a different dominant hand and different space when signing. This posed an interesting question as to how to write the words if the signer was left-handed. After contemplating this for weeks, the chart was assigned to the signer's dominant and nondominant sides rather than left or right. By establishing the chart in this way, the left-handed signer could mirror the location charts, or simply said the left-handed signer could flip the head and body grids horizontally to have the dominant side numbered in the same manner as a right-handed person. This solved the problem.

By the end of the school year, there was still more questions than answers. How to write different parts of a sign, reference hands, and development of NMMs was still needed; after this initial timeframe, complete complex word formation was achieved.

In an effort to make sure that this system was capable of writing complex ASL expressions, the decision to translate ASL poetry was made. The piece "Dew on Spiderweb" was reviewed.[3] The following paragraph is the first 20 seconds of this poetry expression written in its original form.

{DEW ON SPIDERWEB BY ELLA MAE LENTZ}

V6+.,VX'6>     [54.56]4,&4     |zb'25=,.og'25
zb6=.zb" 1=-.((~@6."1,'1.'3,"1.6,3'.'1@)) zb1-|2N123.7n|ZB1=,.+,=,0
 [54.56]3,4 D54–|1Nn1[541,552,563]|,zc3+>.,zb|N1234.7n,6n,5n|0
ZB5+.,0
0|4Nn2.4Nn|ZB5+,0.ZB4+ L5+|2Nn5.Nn5|L5+,D62+.D19+, 57.28,43.12
[85]#     JB25+[5Nn]|2Nn1234.Nn1234|JB25+,37.19,65.45,94.75,
88|1Nn1.1Nn1|88
JB[86]=|JB[84]=     zb3=.zb1=,og.og,zb.zb,og.og,zb.zb
[56.54][88]3,4
zc26+.zc24+;_+._+;89+.87+;_+._+;86+.84+;_+._+;83+.81+;_+._+;
59+.57+;_+._+;56+.
54+;_+._+;53+.51+,ZB5+.,0.CL[469]+,@469,458,'445,'55<@,OG=,
0|4Nn.4Nn|ZB
[85]#
QZ55>.QZ55<;.+;+.46<;64>.55+;55+.46<;64>.55+;55+.46<0
[54.56][88]3 ZB18=.,@18;61;93;88;@;og13

Writing this section, sped up the process of identifying specific features needed for writing. The review of this piece identified more NMMs and new techniques within the writing system. The piece shown above is an early attempt that was written of this ASL expression. The poem includes eye gaze, and body shifts, and also includes raised and lowered eyebrows. The mouth NMMs were not incorporated at this time. The piece has natural paragraph transitions. American Sign Language has topic marker features that easily identify these transitions.

Visual features written in this fashion maximized the variance of the signed language. The classifiers and NMMs that were written in this poetry expression went beyond signs produced in a dictionary. The dictionary of written signs assists in determining continuity for how a sign will be produced as a standard and validates the applications.

While preparing to test the writing system with two hearing college students, a discovery was made; using the comma for shifts made the writing come together. The zero for the reference hand also created visual consistency. The morpheme placement in the written words was established. These developments allowed words to be written with rules that had consistency, and the second test was ready to be implemented.

Reading Words in ASL

During the summer of 2013, I met with two college students to test how well the method was capable of being recreated. This experiment was done to see if what was visualized with a written word would be consistent with other 'readers'. The reader shouldn't be able to anticipate the word, so non-signers were chosen for this experiment. The college students, Jayme and Emily, were taught at different time. The lessons were given privately. A discussion of the method and results that occurred with each student follows.

The first sessions were with Jayme. Jayme began by learning the manual alphabet. Jayme could use the charts to develop the signs, so he did not need to memorize all of the information of the writing system in order to read the writing. We discussed the grids and how the location interacted with the handshapes. Introduction of the zones and palm orientation occurred at this time. We formed some basic sign morphemes, then the shift was. The completed words were achieved at this point. Amazingly this was all completed in one session. Jayme was reading basics signs after about 2.5 hours of training.

In the second session with Jayme, the touch feature with the hand and arm locators was added. Jayme was very quick to catch on to this method and was signing words that included these features right away. These signs were complex signs in that all the different parameters were included in the words. This session was about 2 hours.

In the last session with Jayme, NMM features and the sentence structure were introduced. The basic eyebrows were shown with the questions. This session was the first time that Jayme read sentences and questions. The information was new to Jayme; he had not seen these specific signs before. He was left on his own to contemplate how to sign them based on the written form. Jayme read four sentences/ questions with great success. The first sentences (in their original form) are listed below:

1. .ZB5+@59,51,
44@     |d'5>     h'28>=|1Nn1.3Nn2|h'<28=     {jayme}
|d'5>
2. b'5=_|(4n,4Nn,4N,n1234,Nn1234,N1234.4Nn)|b'5<=-     3+.d"5_,=,
0,|2N234.2N234|
3. ?.d'5< h'28>=|1Nn1.3Nn2|h'28<= zc'6_.zc'4_,(((66,65,64;44,45,46))) ?
4. /.t1+,(19,18,17)/ ?.d1+,(19,18,17)?

Note: Since the time that Jayme read these questions and statements, some adjustments have been made. You will note that the long bar (|) is used for the touch symbol in the above examples. This symbol was changed to the colon (:) for ease of typing; the touch symbol is used so often the symbol needed to be easier to access on the keyboard.

Spacing was exaggerated in these sentences for ease of reading. This would help distinguish word separation until a reader became proficient.

Findings

Reader 1—Jayme

Sentence One

.ZB5+@59,51,44@     |d'5>     h'28>=|1Nn1.3Nn2|h'28<=     {jayme}
|d'5>

Jayme read the first sentence with astounding success. The sign production was perfect. He clearly didn't know the first word he signed, however the sign was executed perfectly. He was signing 'hello'. Since the fingerspelling part of the first sentence is obviously his name {Jayme}. Jayme was able to correctly locate his hands to sign words that included precise location such as :1Nn1.3Nn2: in the sign 'name'. The general area of the sign 'me' was produced with accuracy showing that having to pinpoint the exact location was not necessary for all signs. The precision of the written word will need to either be standardized or will need to be tailored to match the specific signs need.

Sentence Two b'5=_|(4n,4Nn,4N,n1234,Nn1234,N1234.4Nn)|b'5<=–
  d3+.d"5_,=0,|2N234.2N234|

This signed sentence was very successful in creating the sign for 'nice' which is the first word in this two word sentence. The second word did a great job of moving out to show the directional verb. The word—'meet you' was initially written unsatisfactorily. The dominant hand in this word as first written was produced too low. The production of the sign should have been written higher in the body locator as "3 instead of "5. Anticipation of the depth of the sign causing the hand to lower initiated a lower locative position, but it actually looked slightly distorted like the person was lying down or at the bottom of a hill. This finding revealed that the writer should write for the ideal and let the natural process determine if the signed production occurs naturally in a lower area. Typically the hand is almost palm up when it is stretched that far away from the body. The palm facing upward caused the sign production to appear skewed. Analysis suggests that the sign is visually different than the written intention because of the production strain or limitations imposed on by the signer, and an attempt to write the visual representation of the sign rather than the intended distorts the sign more than would otherwise occur. This signed sentence also did not add the d"5 after the hand contact portion in the last word. This looked incomplete. The word should restate the final hand position on the nondominant hand after the hand has moved to the dominant hand.

Sentence Three

?.d'5<     h'28>=|1Nn1.3Nn2|h'28<=zc'6.zc'4,(((66,65,64; 44,45,46)))?

This third one is a question. The question starts with the lowered eyebrow and asks YOU NAME WHAT. This reused the word 'name' and the reader, Jayme, was able to identify the repetition quickly. The new sign 'what' was signed accurately. The number of repetitions with the timing marker—the parenthesis was repeated several times; this could have been written differently using less timing markers. Overall however this question was signed exactly as was intended. The proper handshapes, location, palm orientations and movements were created as well as the NMMs.

Sentence Four

/.t1+,(19,18,17)/ ?.d1+,(19,18,17)?

This final sentence uses a topic marker and a question. The raised eyebrow begins the question to show the topic-'bathroom'. These two signs follow similar movement, or shifts in location of the signs. This can be seen by the similar numbers in the parenthesis. The differences between the signed words are the hand shapes and NMMs. Jayme was able to make the shifts and correct parameters of all the features. This was a wonderful success also.

Again note that the reader would sign the sentence, and Jayme did not know what was being said or asked. During the event another fluent signer was in the room with us who could also understand what was being signed. These sentences and questions were also videotaped at this first reading. The video clip has since been shown to over 20 fluent signers, all of whom agreed that the signing is clear and precise in Sentences 1, 3 and 4. Sentence 2 was shown to fluent signers who also agreed that the placement of the dominant hand should have been repositioned. That is not because the reader errored, rather because the word needs to be written identifying a different location. Again this is only after about 6-8 hours of training.

Reader 2—Emily

Emily and I were able to meet for two sessions. The first session was spent explaining about the system. Emily was shown the charts and basic pieces for creating signs. Emily was open to learning and we planned another session.

At our second session, Emily was shown how to read some basic words. This session was similar to the first session and about an hour and a half was spent learning the writing system. Emily was asked to read a list of about 10 words. These words were shared with her through Google Drive. They are as follows:

l'53–.l'51–,'41>–.'33<–,'42–.'32–,'43>–.'31<–

.f1+,=

|D82<,|49

.D4=,V7

.s1+,–,+,–

.h'1–,ho

|B[469]=

|BA[854]<,|[515]

|O[52]<

.lb'8–;'5;'2

Emily reviewed these words and then on her own video-taped herself signing them. She numbered them by stating the order in which she read them; this was because she did not know what the signs meant. Emily was hoping to learn what the signs meant, but for the experiment, the signs were not explained. This was to make sure that the iconic nature of the sign would not influence the outcome of her sign production.

Word One l'53–.l'51–,'41>–.'33<–,'42–.'32–,'43>–.'31<–

This word was too complicated, and Emily did not feel ready yet to try it. The newness of the written word and the extra system detoured her from making an attempt.

Word Two

.f1+,=

The sign was executed perfectly. Again Emily had created these videos on her own after only a couple hours of training. In this video she used the correct hand, handshape, location, zone, palm orientations and shifts.

Word Three

|D82<,|49

This sign is done with the dominant hand touching the spots located on the head. It has a shift. The rule for writing the words is that the uppermost part of the palm is to be placed in the locations given. In this example and in a similar sign that repeats these sign features only with a different handshape, the exact location of the hand part that touches the head or body needed to be specified. This sign was acceptable, and would probably be understood by the majority of fluent signers, but without an exact location identified on the head the sign for 'deaf' was not as clear. Obviously this sign must be exactly done. Adjustments in this written system to specify the location of where the hand touches the head or body were made. The word is now written .:1N1:D82<,:49

Word Four

.D4=,V7

This sign was executed perfectly. It is the sign for 'half'. The number 1 is shown over the number 2. Clearly read and exactly representation.

Word Five

.s1+,–,+,–

Emily used the correct hand, handshape, palm orientation and shifts. This sign production however was positioned in the 'S' placement rather than the 's' placement. The reader overlooked the lower case letter and placed this sign in the head locator area instead of the body locator. Interestingly enough, a fluent signer was asking Emily what the word was she was reading; she showed him the word, and the fluent signer showed her the correct way to sign it. When Emily looked at the word to see, she replied that yes that was the right way to sign it.

Word Six

.h'1–,ho

Again this sign was executed perfectly. The proper hand, handshapes, location, zone, palm orientation and shifts were performed.

Word Seven

|B[469]=

This sign was a contact sign with the forehead area. The production of this sign was skewed. The exact location of the fingers needed to be specified for the touch location. Also this sign needed to address facial contours. The reader perceives the face as a 2D drawing. However the side of the face, such as the temple, is included in this picture by the way the picture is drawn. This would need to be emphasized with the reader to assist in placement of the contact area. Emily tried to lay her hand in a flat position on the side of her face, rather than following her face contour. This and the way the sign was executed with the side of the pinky finger touching rather than the first four fingertips, created an unreadable distorted sign. Training and contact identification of the hand should resolve this confusion. This sign is now written as .:N1234:B[469]=

Word Eight

|BA[854]<,|[515]

This is the sign referenced earlier when the sign for 'deaf' was referenced. This sign means 'head'. The contact location was correctly identified, but the specific place on the hand to touch the face was not identified, therefore the signer read the word with not enough direction to create a recognizable sign. This sign should have touched the first finger near the tip on the inside of the finger near the body—namely 1N1. Instead Emily followed the rule to touch the face with the finger that is closest to the body before contact. You can see from the sign production, that Emily read it correctly because she used her thumb rather than her pointer finger to make contact. This error in the written word is now corrected by using the hand locator information. This was a good finding in the research. Now the word is written .:1N1:BA[854]<,:[515]

Word Nine

|O[52]<

In this sign was queried to see if the correct placement of the hand could be achieved with the combination of just a placement. Emily signed this word exactly as written; it was a perfect execution of the sign.

Word Ten

.lb'8–;'5;'2

This final word was also performed with 100% accuracy. This sign included the semi colon. The semicolon directs the reader to speed up the sign through the movement. This adjustment in the shift was smoothly executed and the concept of 'childhood' was clearly conveyed.

Upon completion of this research, the secrecy of the signed meaning was no longer necessary. Emily sought information about what the signs meant. Jayme also learned the meaning of the sentences and questions he said after he had executed them. Their hours of work toward this research is appreciated.

The final comparison was done when approximately 6 fluent Deaf signers were taught this same method for writing ASL. Because the fluent signers were already familiar with the manual alphabet and how signs were developed, they were able to learn the material at a very accelerated rate. What took the two college students about 3 hours to learn, was comprehended by the Deaf students in about 30 minutes. This ease of learning was promising and encourages a belief that this writing system will be easy to adopt by the Deaf and signing community.

REFERENCES

[1] "Signs as Words: Sign Languages." *Signs as Words: Sign Languages*. N.p., n.d. Web. 5 Oct. 2013. <http://www.istc.cnr.it/mostralis/eng/pannello07.htm>.

[2] Mouth morphemes in ASL: A closer look. (2008). SIL-International, University of ND Bickford, J. Albert & Pima Community College K Fraychineaud. http://www.editora-arara-azul.com.br/ebooks/catalogo/3.pdf

[3] "Poem-Dew on Spiderweb.mov." YouTube. YouTube, 16 Jul. 2010. Web. 5 Oct. 2013. <http://www.youtube.com/watch?v=YaHChvFWegQ>.

I claim:

1. A method for writing sign language using a standard keyboard comprising:
   receiving sign language images representing a specific meaning of words, wherein the sign language images showing hand shapes, hand movement, head locations, arm locations and body locations;
   dividing the sign language images into a plurality of regions;
   extracting manual markers from the plurality of regions, wherein the manual markers define the hand shapes and the hand movement;
   associating the manual markers to a first set of symbols on the standard keyboard;
   extracting non-manual markers from the plurality of regions, wherein the non-manual markers define tongue, lips and eyebrow positions;
   associating the non-manual markers to a second set of symbols on the standard keyboard, wherein the second set of symbols are different from the first set of symbols;
   extracting timing markers from the sign language images, wherein the timing markers define timing of the hand movement and repetition of the hand movement;
   associating the timing markers to a third set of symbols on the standard keyboard, wherein the third set of symbols are different from both the first set and the second set of symbols;
   converting the sign language images into character strings as the writing sign language based on the first set symbols, the second set symbols and the third set symbols associated on the standard keyboard.

* * * * *